(12) United States Patent
Iwahashi et al.

(10) Patent No.: US 7,962,674 B2
(45) Date of Patent: Jun. 14, 2011

(54) BUFFER MANAGEMENT DEVICE, BUFFER MANAGEMENT METHOD, AND INTEGRATED CIRCUIT FOR BUFFER MANAGEMENT

(75) Inventors: Daisuke Iwahashi, Nara (JP); Hideyuki Kanzaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 183 days.

(21) Appl. No.: 12/523,099

(22) PCT Filed: Nov. 27, 2008

(86) PCT No.: PCT/JP2008/003488
§ 371 (c)(1),
(2), (4) Date: Jul. 14, 2009

(87) PCT Pub. No.: WO2009/069297
PCT Pub. Date: Jun. 4, 2009

(65) Prior Publication Data
US 2010/0017548 A1    Jan. 21, 2010

(30) Foreign Application Priority Data
Nov. 27, 2007    (JP) .................................. 2007-305406

(51) Int. Cl.
  *G06F 3/00*    (2006.01)
  *G06F 13/00*    (2006.01)
(52) U.S. Cl. ................. 710/52; 710/16; 710/36; 710/55; 710/58; 711/100
(58) Field of Classification Search .......................... None
See application file for complete search history.

(56) References Cited

U.S. PATENT DOCUMENTS

2005/0240939 A1* 10/2005 Motoyama et al. ........... 719/313
2005/0246696 A1* 11/2005 Alexander et al. ............ 717/151
2005/0265337 A1    12/2005 Tomizawa

FOREIGN PATENT DOCUMENTS

| JP | 6-95936 | 4/1994 |
|---|---|---|
| JP | 2001-186181 | 7/2001 |
| JP | 2001-257716 | 9/2001 |
| JP | 2001-268116 | 9/2001 |
| JP | 2002-185418 | 6/2002 |
| JP | 2005-236363 | 9/2005 |
| JP | 2005-333474 | 12/2005 |

OTHER PUBLICATIONS

International Search Report issued Feb. 3, 2009 in the International (PCT) Application of which the present application is the U.S. National Stage.

* cited by examiner

*Primary Examiner* — Alan Chen
(74) *Attorney, Agent, or Firm* — Wenderoth, Lind & Ponack L.L.P.

(57) ABSTRACT

A buffer management apparatus that sequentially receives L (L>1) types of data and transmits the L types of data to an external device, including: a reception unit that receives data; M (M<L) data storage units, each including a buffer area; an interval storage unit that, for each type of data, stores reception interval information; M timing units, that each time an elapsed time from a last storing of data in a corresponding data storage unit, and a control unit that, if all of the data storage units have been allocated, in particular, to different types of data, according to a judgment result based on the elapsed times and the reception interval information, either stores the received data in at least one of the data storage units in place of previously stored data, or transmits the received data to the external device.

8 Claims, 19 Drawing Sheets

FIG. 9

| SECTION DATA | BURST NUMBER | BURST INTERVAL [msec] | CYCLE [msec] |
|---|---|---|---|
| PAT | 1 | - | 100 |
| NIT | 2 | 0.1 | 10,000 |
| EIT | 2 | 1 | 100 |
| DMS-CC | 1 | - | 3 |

BUFFER MANAGEMENT DEVICE, BUFFER MANAGEMENT METHOD, AND INTEGRATED CIRCUIT FOR BUFFER MANAGEMENT

TECHNICAL FIELD

The present invention relates to buffering of data, and in particular to technology for improving use efficiency of a buffer.

BACKGROUND ART

One multiplexing format established by MPEG 2 (Moving Picture Experts Group phase 2) is a transport stream. In transport streams, PESs (Packetized Elementary Streams) that are video and audio to be transmitted (elementary streams) which have been divided into portions of a predetermined size and packetized, and control information, etc. (hereinafter referred to as "section data") for decoding elementary streams are divided into fixed length packets called transport packets (hereinafter called "TS packets") and transmitted. Note that packet identifiers (hereinafter referred to as "PIDs") that can identify a type of data included in a payload are included in the headers of these TS packets.

A data transfer apparatus is known that, in order to obtain, as necessary, such PESs and section data that have been divided into TS packets and transmitted, sequentially receives the transmitted TS packets and transfers the received TS packets to a memory area in accordance with the type of received TS packet.

The following describes this conventional data transfer apparatus.

FIG. 19 is a block diagram showing a structure of a conventional data transfer apparatus 5.

As shown in FIG. 19, the data transfer apparatus 5 includes a reception unit 1, a PID filter 2, a section filter 3, and an output unit 4.

The reception unit 1 transfers the received TS packets to the PID filter 2. In accordance with a PID set by a control unit (not depicted), the PID filter 2 extracts a TS packet that includes divided data of a necessary PES (hereinafter referred to simply as a "PES TS packet"), and transmits the extracted PES TS packet to the output unit 4. The PID filter 2 also extracts a TS packet including divided data of necessary section data (hereinafter, referred to simply as a "section data TS packet") and transmits the extracted section data TS packet to the section filter 3.

The section filter 3 transmits, to the output unit 4, data of the payload of a transmitted TS packet from which unnecessary data such as stuffing bytes have been removed (hereinafter, the data as a whole is referred to simply as a "packet", and data of the payload of a TS packet from which unnecessary data such as stuffing bytes have been removed is referred to as "valid data"). The output unit 4 burst transfers, that is, transfers as a group, the payloads of TS packets transmitted from the PID filter 2 and valid data of packets transmitted from the section filter 3 to separate areas in the memory 6 according to the respective PIDS. That is to say, the output unit 4 burst transfers each of the TS packets received by the reception unit 1 to the memory 6 as one unit.

Note that technology for extracting predetermined PESs and section data pieces with use of a PID filter and a section filter, as in the data transfer apparatus 5, is disclosed in patent document 1, for example.

Patent document 1: Japanese Patent Application Publication No. 2001-257716

DISCLOSURE OF THE INVENTION

Problems Solved by the Invention

However, the size of a payload of a TS packet is a fixed length (184 bytes), and in the conventional data transfer apparatus 5, since each received TS packet is burst transferred as a unit to a memory 6, when the size of the payload of the TS packet is smaller than the size that can be transferred in one burst transfer according to the specifications of the memory 6, there is a problem of decreased efficiency of the transfer to the memory 6. When the efficiency of the transfer to the memory 6 decreases, the frequency of access to the memory 6 by the output unit 4 increases, which may be a factor in impeding access to the memory 6 for other processing.

To handle this problem, for example, there is a method of buffering payloads of TS packets and valid data of packets in an output unit 4, and transmitting the buffered data to the memory 6 each time the data size thereof reaches a maximum size that can be burst transferred. However, as described above, since it is necessary to burst transfer to areas in the memory 6 that are separately allocated according to types of data, it is necessary to perform buffering separately for each type of data, and if buffers are provided for each type of data, a new problem arises of the circuitry scale becoming too large.

The present invention was achieved in view of the above problem, and an aim thereof is to provide a buffering management apparatus that can be used to efficiently burst transfer data to a memory, with use of fewer buffers than the number of types of data that can be received.

Means to Solve the Problems

In order to solve the above problem, the buffer management apparatus of the present invention sequentially receives L (L>1) types of data and transmits the L types of data to an external device, and includes: a reception unit operable to receive data; M (M<L) data storage units, each including a buffer area, and each to be allocated respectively to data of a same type as data stored in the buffer area thereof; an interval storage unit operable to, for each type of data, store information pertaining to a reception interval thereof, the reception interval being a length of time between receiving two pieces of a same type of data; M timing units in one-to-one correspondence with the data storage units, each operable to time an elapsed time from a last storing of data in a corresponding data storage unit, and a control unit, wherein if a data storage unit has been allocated to data of a same type as the data received by the reception unit, the control unit stores the received data in the data storage unit, and, according to a predetermined condition, transmits data stored in the data storage unit to the external device, if none of the M data storage units has been allocated to data of the same type as the data received by the reception unit, and there is one or more data storage units that have not been allocated to any type of data, the control unit stores the received data in one of the one or more data storage units that have not been allocated to any type of data, and allocates the data storage unit to data of the same type as the stored received data, if all of the data storage units have been allocated to different types of data from the data received by the reception unit, the control unit judges, according to the elapsed times timed by the timing units in correspondence with the data storage units and information stored in the interval storage unit, whether to cause the received data to be stored in any of the data storage units, if the judgment is affirmative, the control unit transmits all of the data stored in at least one of the data storage units to the external device, stores the received data in the at least one of the data storage units, and allocates the at least one of the data storage units to data of the same type as the stored data, and if the judgment is negative, the control unit transmits the received data to the external device.

Also, in order to solve the above problem, the buffer management method of the present invention is used in a buffer management apparatus that sequentially receives L (L>1) types of data and transmits the L types of data to an external device, the buffer management apparatus including: M (M<L) data storage units, each including a buffer area, and each to be allocated respectively to data of a same type as data stored in the buffer area thereof; an interval storage unit operable to, for each type of data, store information pertaining to a reception interval thereof, the reception interval being a length of time between receiving two pieces of a same type of data, and M timing units in one-to-one correspondence with the data storage units, each operable to time an elapsed time from a last storing of data in a corresponding data storage unit, the buffer management method including: a reception step of a reception unit receiving data, and a transmission step in which a control unit, if a data storage unit has been allocated to data of a same type as the data received by the reception unit, stores the received data in the data storage unit, and, according to a predetermined condition, transmits data stored in the data storage unit to the external device, if none of the M data storage units has been allocated to data of the same type as the data received by the reception unit, and there is one or more data storage units that have not been allocated to any type of data, the control unit stores the received data in one of the one or more data storage units that have not been allocated to any type of data, and allocates the data storage unit to data of the same type as the stored received data, if all of the data storage units have been allocated to different types of data from the data received by the reception unit, the control unit judges, according to the elapsed times timed by the timing units in correspondence with the data storage units and information stored in the interval storage unit, whether to cause the received data to be stored in any of the data storage units, if the judgment is affirmative, the control unit transmits all of the data stored in at least one of the data storage units to the external device, stores the received data in the at least one of the data storage units, and allocates the at least one of the data storage units to data of the same type as the stored data, and if the judgment is negative, the control unit transmits the received data to the external device.

In order to solve the above problem, the integrated circuit for buffer management of the present invention is used in a buffer management apparatus that sequentially receives L (L>1) types of data and transmits the L types of data to an external device, including: a reception unit operable to receive data; M (M<L) data storage units, each including a buffer area, and each to be allocated respectively to data of a same type as data stored in the buffer area thereof; an interval storage unit operable to, for each type of data, store information pertaining to a reception interval thereof, the reception interval being a length of time between receiving two pieces of a same type of data; M timing units in one-to-one correspondence with the data storage units, each operable to time an elapsed time from a last storing of data in a corresponding data storage unit, and a control unit, wherein if a data storage unit has been allocated to data of a same type as the data received by the reception unit, the control unit stores the received data in the data storage unit, and, according to a predetermined condition, transmits data stored in the data storage unit to the external device, if none of the M data storage units has been allocated to data of the same type as the data received by the reception unit, and there is one or more data storage units that have not been allocated to any type of data, the control unit stores the received data in one of the one or more data storage units that have not been allocated to any type of data, and allocates the data storage unit to data of the same type as the stored received data, if all of the data storage units have been allocated to different types of data from the data received by the reception unit, the control unit judges, according to the elapsed times timed by the timing units in correspondence with the data storage units and information stored in the interval storage unit, whether to cause the received data to be stored in any of the data storage units, if the judgment is affirmative, the control unit transmits all of the data stored in at least one of the data storage units to the external device, stores the received data in the at least one of the data storage units, and allocates the at least one of the data storage units to data of the same type as the stored data, and if the judgment is negative, the control unit transmits the received data to the external device.

Effects of the Invention

In the buffer management apparatus, buffer management method, and integrated circuit for buffer management of the present invention having the above-described structure, if all data storage units are allocated to data of different types from received data, with reference to elapsed times measured by timing units in correspondence with data storage units and information stored by an interval storage unit, a judgment is made as to whether to store the received data in a data storage unit. According to the result of the judgment, either the received data is caused to be stored in one data storage unit, in place of all the data already stored in the one data storage unit, or the received data is transmitted directly to an external device.

Accordingly, when an affirmative judgment is made if the time until receiving the next piece of data of the same type as the received data piece is shorter than the time until receiving the next piece of data of the same type for another type of data already stored in one of the data storage units, the judgment being performed, for example, according to the elapsed times measured by the timing units corresponding to the data storage units and the information stored by the interval storage unit, the buffer management apparatus pertaining to the present invention can store data of types that are comparatively frequently received with use of fewer data storage units than the types of data that can be received, transmit such frequently received types of data to the external device as a group, and can be used efficiently for burst transfer to the external memory.

Also, the control unit may calculate, for each data storage unit, a first time that is a time period until receiving a next piece of data of a same type as data allocated to the data storage unit, according to an elapsed time timed by a timing unit corresponding to the data storage unit and information pertaining to the reception interval for data of the type allocated to the data storage unit, calculate, for the type of data received by the reception unit, a second time that is a time period from receiving the received data until receiving a next piece of data of the same type as the received data, according to information pertaining to the reception interval stored in the interval storage unit, judge negatively if the second time is longer than each of the first times, and judge affirmatively if the second time is shorter than one of the first times, and the data storage unit in which the received data is stored if the judgment is affirmative is a data storage unit storing data of a type for which the first time is shorter than the second time.

According to this structure, the buffer management apparatus pertaining to the present invention calculates, for each storage unit, a first time that is a time period until receiving a next piece of data of the same type as the data to which the data storage unit is allocated, and a second time that is a time period until receiving a next piece of data of the same type as the received data, and performs the judgment of the control unit according to each of the calculated first times and the second time. The data pertaining to the longest of the first times and the second time is output to the external device. In other words, since this structure enables storing data of types that are comparatively frequently received with use of a number of data storage units that is less than the types of data that can be received, the buffer management apparatus pertaining to the present invention can transmit data of a comparatively frequently received type to the external device as a group, and can be used efficiently for burst transfer to the external memory.

Also, the L types of data may include a plurality of types of intermittently received data having two types of reception interval, a first interval, and a second interval that is longer than the first interval, and the information stored in the interval storage unit pertaining to the reception intervals for the intermittently received data may include information indicating a first interval and information indicating a second interval, and the buffer management apparatus may further include: a burst number storage unit operable to store, for each type of intermittently received data, a burst number that is a number of pieces of the type of intermittently received data consecutively received at every occurrence of the first interval, and a plurality of counters operable to count, for each type of the intermittently received data, a reception number indicating a number of times of receiving pieces of the type of intermittently received data, wherein the information used by the control unit for calculating the first time and the second time of the intermittently received data may be information indicating the first interval when a counter value corresponding to the intermittently received data is less than a value stored in the burst number storage unit for the intermittently stored data, and may be information indicating the second interval when the counter value corresponding to the intermittently received data is identical to the value stored in the burst storage unit pertaining to the intermittently received data, and the control unit, when the counter value corresponding to the intermittently received data exceeds the value stored in the burst number storage unit for the type of intermittently received data, may set the counter value to 1, and perform the calculation.

According to this structure, since the buffer management apparatus pertaining to the present invention selects information used for calculating the first time and the second time for the intermittently received data including the first interval and the second interval as the reception intervals, based on a relationship between the burst number and the counter value of the intermittently received data, the first time and the second time can be calculated accurately. Accordingly, since data of frequently received types can be accurately stored, the buffer management apparatus pertaining to the present invention can transmit data of a frequently received type to the external device as a group, and can be used efficiently for burst transfer to the external memory.

Also, the buffer management apparatus of claim 2 may further include an interval calculation unit operable to, for each type of data, measure a reception interval of receiving the type of data, and store a value according to the measurement in the interval storage unit as information pertaining to the reception interval for the type of data.

According to this structure, since the interval calculation unit stores the information pertaining to the reception interval for each type of data in the interval storage unit, the buffer management apparatus pertaining to the present invention can save the time taken, by an administrator, etc. of the buffer management apparatus pertaining to the present invention, in setting the information pertaining to the reception intervals in advance.

Also, the interval storage unit may be operable to store information pertaining to reception intervals of N (N<L) types of data, the control unit, if the information pertaining to the reception interval for the type of data received by the reception unit is not stored in the interval storage unit, may notify information indicating the type of data to the interval calculation unit, and the interval calculation unit, when the notified information has been received from the control unit, may (i) if information pertaining to the reception intervals of the N types of data is not stored in the interval storage unit, store a value according to the measurement of the type of data indicated by the notified information in the interval storage unit as the information pertaining to the reception interval for the type of data, and (ii) if information pertaining to the reception intervals of the N types of data is stored in the interval storage unit, store, in place of the information pertaining to the reception interval of any one type of data, the value according to the measurement of the type of data indicated by the notified information in the interval storage unit as the information pertaining to the reception interval for the type of data.

According to this structure, when judging whether to cause the received data to be stored in the data storage unit, if the information pertaining to the reception intervals for the type of data is not stored in the interval storage unit, since the buffer management apparatus pertaining to the present invention stores the information related to the reception interval, the above judgment can be performed with use of interval storage units having comparatively less capacity.

Also, the buffer management apparatus may sequentially receive the L types of data, and perform processing for transmitting the L types of data to the external device separately for each of a plurality of data sets, wherein one type of data from among the L types of data may include identification information of a data set in which the data is included, the interval calculation unit, for each type of the data, may measure a reception interval for the type of data, and perform processing for storing the value according to the measurement in the interval storage unit, as the information pertaining to the reception interval for the type of data, for each of the plurality of data sets respectively; the interval storage unit may be operable to store, for each of P data sets when P is a number that is less than a number of receivable data sets, information pertaining to reception intervals of L types of data, the control unit, when identification information of the data set is included in the received data, if the information pertaining to the reception interval for the data set identified by the identification information is not stored in the interval storage unit, may notify the identification information to the interval calculation unit, and the interval calculation unit, when a notification has been received from the control unit, (i) if information pertaining to the reception intervals of the P data sets is not stored in the interval storage unit, may store a value according to the measurement of the type of data for the data sets indicated by the notified identification information, in the interval storage unit as the information pertaining to the reception interval, and (ii) if information pertaining to the reception intervals of the P data sets is stored in the interval storage unit, store, in place of the information pertaining to the reception interval of any one data set, the value according to the measurement of the type of data for the data set indicated by the notified identification information, in the interval storage unit as the information pertaining to the reception interval.

According to this structure, when identification information for data sets is included in the received data, if information pertaining to the reception interval for the data set identified by the identification information is not stored in the interval storage unit, since this structure stores the information pertaining to the reception interval in the interval storage unit, this structure enables judging whether to cause the data included in the data set to be stored in the data storage unit, with use of a interval storage unit having comparatively less storage capacity.

BRIEF DESCRIPTION OF THE DRAWINGS

FIG. 9 shows exemplary burst numbers, burst intervals, and cycles of TS packets that transmit types of section data;

Figure 1:
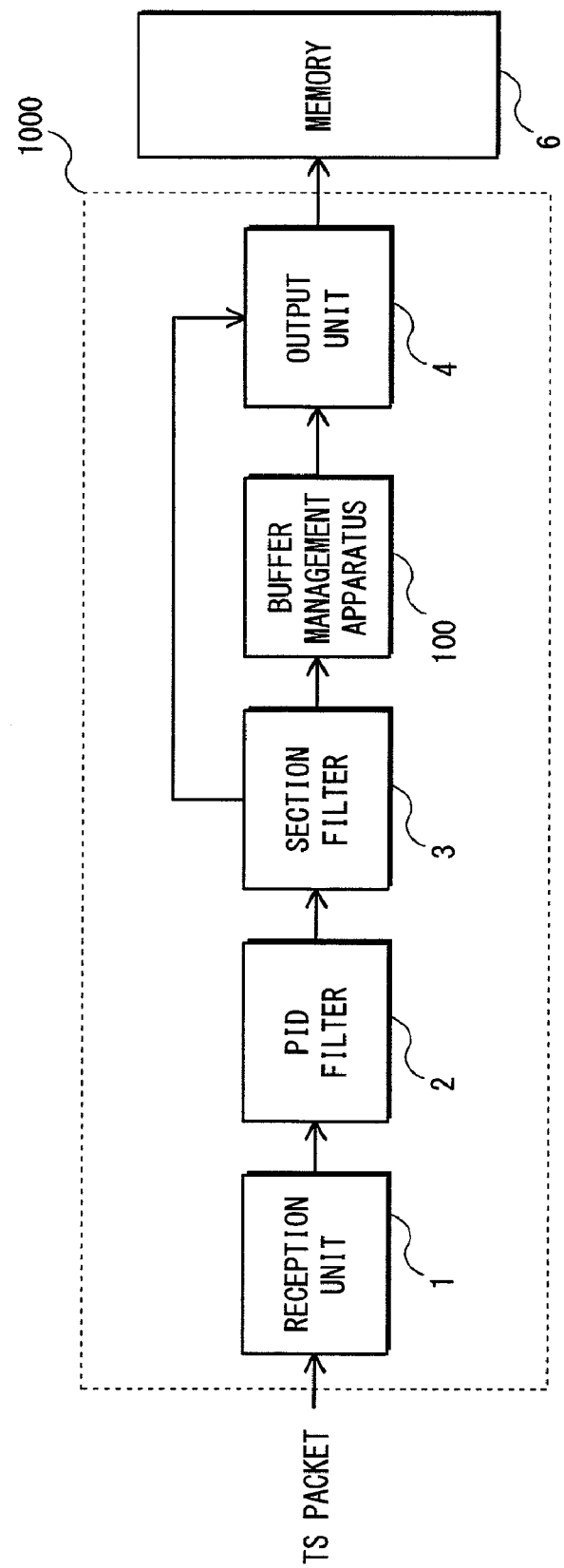
FIG. 1 is a block diagram of a structure of a data transfer apparatus 1000 using a buffer management apparatus 100.

DESCRIPTION OF THE CHARACTERS 1 reception unit
2 PID filter
3 section filter
4 output unit
5, 1000 data transfer apparatus
6 memory 100, 200 buffer management apparatus
110 switching circuit
120 buffer unit
121A, B data management unit
122 storage unit
123 identifier storage unit
124 valid flag storage unit
125 timer
126 storage control unit
130 multiplex circuit
140 priority determination circuit
141A to D transmission interval storage unit
142A to D burst number counter
150 analysis unit
51A, B section length management unit
152 section length storage unit
153 section size count unit
154 completion control unit

BEST MODE FOR CARRYING OUT THE INVENTION

The following describes an embodiment of the buffer management apparatus of the present invention.

Embodiment

Overview

A buffer management apparatus 100 of the present embodiment is an apparatus for enabling efficient burst transfer of received data to a memory by efficiently using a number of storage units (buffer areas each having a fixed length, respectively) that is less than a number of types of data that can be received.

FIG. 1 is a block diagram of a structure of a data transfer apparatus 1000 using the buffer management apparatus 100.

Figure 19:
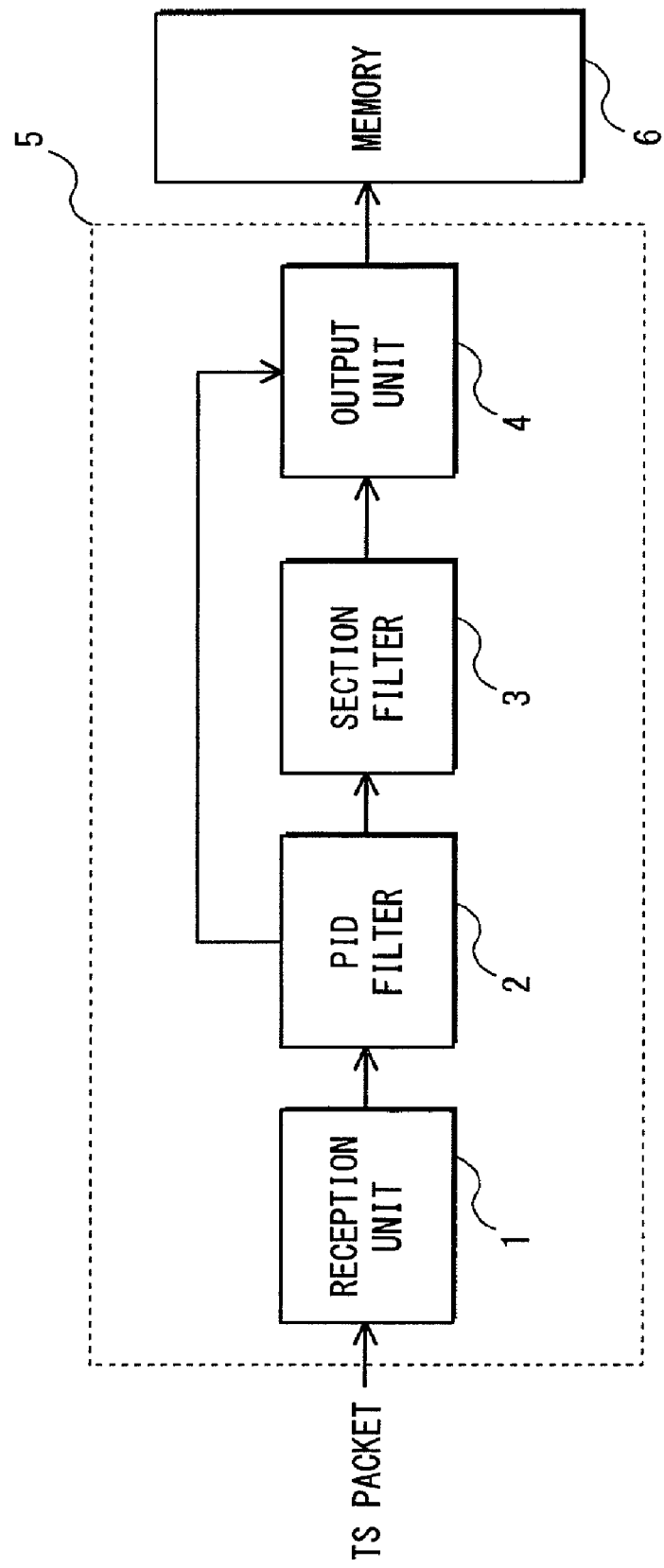
FIG. 19 is a block diagram of a structure of a conventional data transfer apparatus 5.

A reception unit 1, a PID filter 2, a section filter 3, an output unit 4, and a memory 6 in FIG. 1 are the same as those depicted in FIG. 19. Hereinafter, the reception unit 1 refers to a unit for receiving MPEG 2-compliant digital broadcasts.

In FIG. 1, the buffer management apparatus 100 is disposed between the section filter 3 and the output unit 4, and receives a packet (constituted from TS packet headers of section data, and valid data constituted from TS packet payloads of the section data from which unnecessary data, such as stuffing bytes, have been removed) transmitted from the section filter 3. Since there are a plurality of types of section data, there are also a plurality of types of valid data of packets received by the buffer management apparatus 100. The types of section data and content thereof are described later.

Since the output unit 4 burst transfers data to respective areas in the memory 6 that are separately allocated according to the type of data, in order to perform this burst transfer efficiently, the buffer management apparatus 100 may store valid data of received packets in storage units separately for each type and transmit the data to the output unit 4 when the size of the stored data reaches a maximum size that can be burst transferred.

However, to prevent an increase in circuitry scale, since the number of storage units in the buffer management apparatus 100, as described above, is less than the number of types of valid data of receivable packets, valid data for all types of packets cannot be stored simultaneously.

For this reason, if all of the storage units are storing data of different types from the valid data of the received packet, the buffer management apparatus 100 transmits, to the output unit 4, data having a lowest priority for being stored in the storage unit, from among the valid data of the received packet and the data stored in the storage units. Here, the priority is determined so that the longer an anticipated time before receiving a next piece of data of a same type, the lower the priority.

According to this structure, preferentially storing, in the storage units, data for which a next piece of the same type is anticipated to be received in a short time, in other words, data of a type that is frequently received, enables the buffer management unit 100 to efficiently use a number of storage units that is less than the number of types of valid data in receivable packets, and since this structure increases the possibility of transmitting frequently received types of data to the output unit 4 at the maximum burst transferable size, the output unit 4 can efficiently perform burst transfer to the memory 6.

Note that the maximum size that the output unit 4 can burst transfer is determined by the specifications of the memory 6, and is described hereinafter as being 256 bytes.

Data

First, the data used by the buffer management apparatus 100 is described.

TS Packets

The following briefly describes the structure of TS packets, which are units for transmitting section data.

Figure 3:
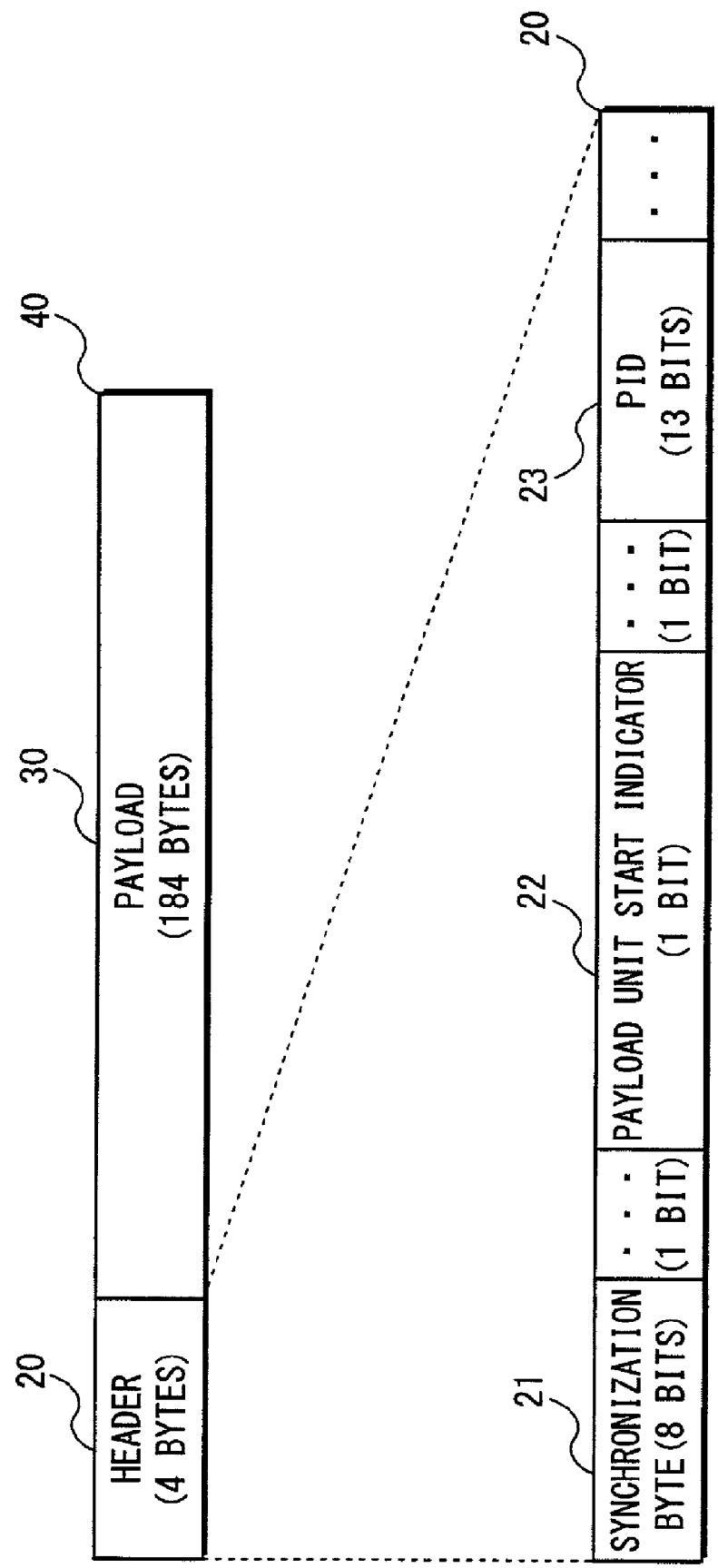
FIG. 3 shows a data structure of a TS packet 40.

FIG. 3 shows a data structure of a TS packet 40.

As shown in FIG. 3, the TS packet 40 is a 188-byte fixed length packet including a 4-byte header 20 and a 184-byte payload 30.

The payload 30 is data material targeted for transmission, and the header 20 is data that includes a synchronization byte 21, a payload unit start indicator 22, and a PID 23.

Here, the synchronization byte 21 is data that indicates a start of the TS packet 40, and a fixed value "0x47" is set therein.

The payload unit start indicator 22 is data indicating whether a starting byte of the section data is included in the payload 30. A setting of "1" indicates that the starting byte of the section data is included. Note that since there are cases in which a plurality of types of section data are included in one TS packet, a setting of "1" indicates that at least one starting byte of section data is included.

The PID 23 is an identifier indicating a type of section data included in the payload 30.

Section Data

Next, the following describes the types and content of the section data.

Various types of data such as PAT (Program Association Table, PMT (Program Map Table), NIT (Network Information Table), EIT (Event Information Table), and DSM-CC (Digital Storage Media-Command and Control) are included in the section data. The following briefly describes each type of data.

A PAT is data that specifies a PID of a TS packet that transmits PMTs related to broadcast programs included in transport streams, and the PID of a TS packet that transmits a PAT is "0x0000" (a fixed value).

Also, a PMT is data that specifies PIDs of TS packets that transmit images, audio, etc. included in a corresponding broadcast program. The PID of a TS packet that transmits a PMT is not a fixed value as described above, but is specified indirectly by the PAT.

The data sizes of the PAT and the PMT are generally small (for example, around 25 bytes), and can often be transmitted by one TS packet.

An NIT is data that, in order to indicate which channels the broadcast programs are transmitted on, specifies frequencies and orbital positions of the channels, modulation methods, etc., and the PID of a TS packet that transmits the NIT is "0x0010" (a fixed value). The data size of the NIT is generally larger than the PAT or the PMT (for example, 200 bytes), and there are many cases in which the NIT is divided into two or three TS packets and transmitted.

Also, an EIT is data included in information related to the program such as a name or broadcast time and date of a broadcast program, broadcast content etc., and the PID of a TS packet that transmits the EIT is "0x0012" (a fixed value).

A DSM-CC is data included in content data for data broadcast, and a PID of a TS packet that transmits a DSM-CC is not a fixed value, and is indirectly specified by the PMT.

The data sizes of the EIT and the DSM-CC in general is larger than the above-described PAT, PMT and NIT, etc. (for example, 1000 bytes), and there is a tendency to divide one EIT or one DSM-CC between a plurality of TS packets and perform transmission.

The following describes a data structure of section data.

Although the data structure of the section data is different depending on the type of section data, since section data pieces in the vicinity of the starting bit have a common data structure, hereinafter a data structure of a section data piece in the vicinity of the starting bit is described using a PAT as an example.

Figure 4:
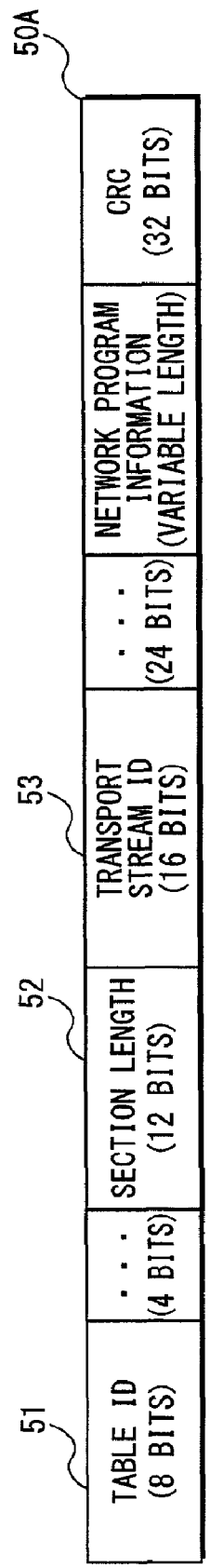
FIG. 4 shows a data structure of a PAT 50A.

FIG. 4 shows a data structure of a PAT 50A.

As shown in FIG. 4, the PAT 50A includes a table ID 51, a section length 52, and a transport stream ID 53. The table ID 51 is an identifier of a type of section data, and the section length 52 is data that indicates a length of data from immediately after this field to the end of the section. The transport stream ID 53 is an identifier for transport streams.

Correspondence Between Section Data and TS Packets

Figure 5:
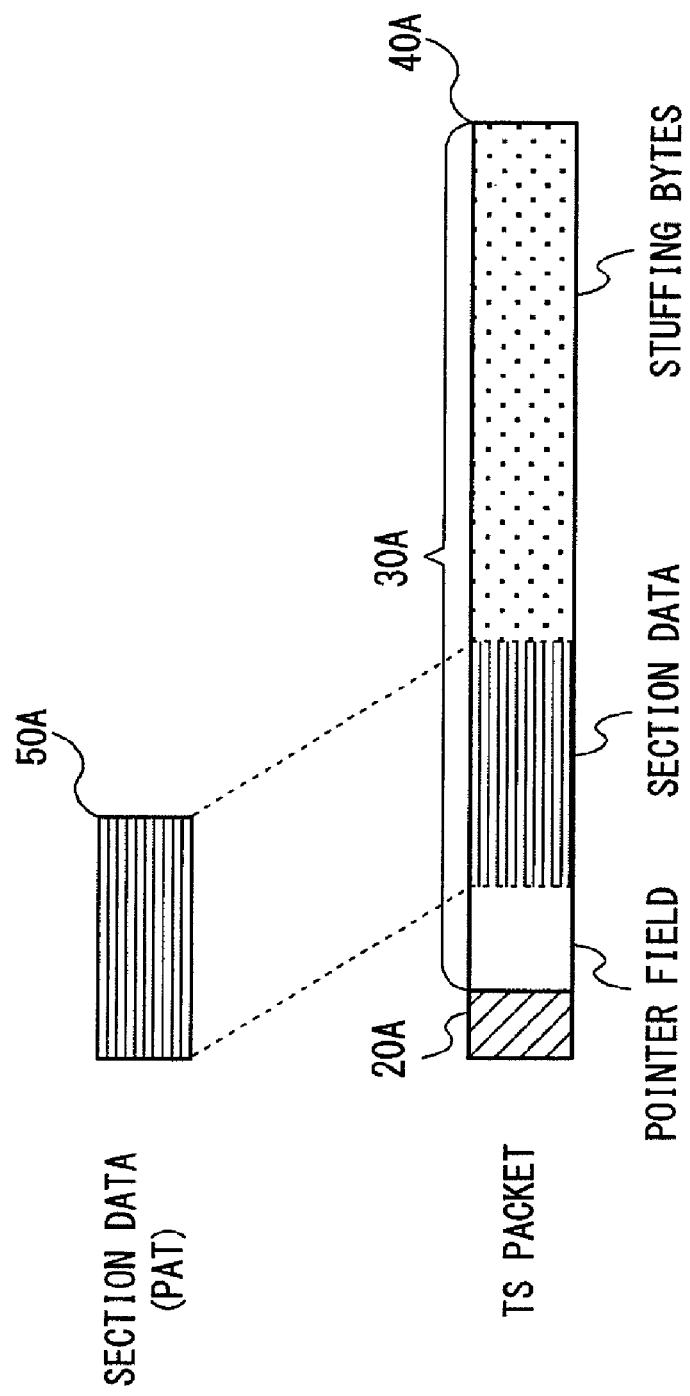
FIG. 5 shows a structure of a TS packet 40A that transmits the PAT 50A.

FIG. 5 shows a structure of a TS packet 40A that transmits the PAT 50A.

FIG. 5 shows an example of the PAT 50A being transmitted by one TS packet 40A.

In a payload 30A following the header 20A, as shown in FIG. 5, stuffing bytes (data having a value of 0xFF), for making the payload 30A a fixed length, follow after the section data (PAT).

Note that a pointer field in FIG. 5 is data indicating, in a case that the payload unit start indicator 22 is set to "1", a number of bytes until a position that includes the starting byte of the section data, and in FIG. 5, since the starting byte of the section data (PAT) follows immediately after the pointer field, the pointer field is set to "0".

Note that, although not expressly depicted or described, in general, the data size of PMT is also small similarly to PAT, and the TS packets that transmit PMT also have the same structure as the above-described TS packet 40.

Figure 6:
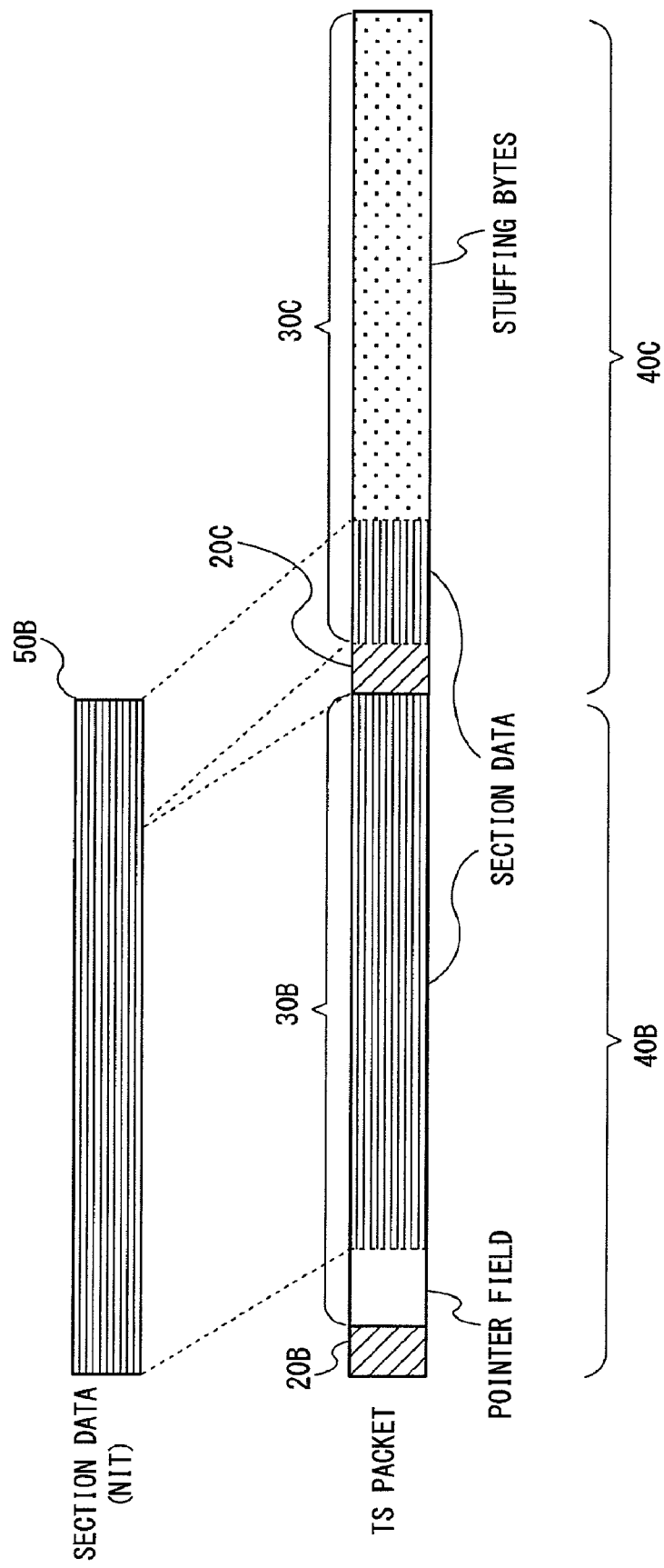
FIG. 6 shows structures of TS packets 40B and 40C that transmit an NIT 50B.

FIG. 6 shows structures of TS packets 40B and 40C that transmit an NIT 50B.

FIG. 6 shows an example of transmission by two TS packets 40B and 40C to the NIT 50B. In this example, a payload 30B that follows a header 20B of a first TS packet 40B is filled with data constituting the NIT 50B, but the payload 30C following the header 20C of the second TS packet 40C is adjusted to be the fixed length with use of stuffing bytes.

Figure 7:
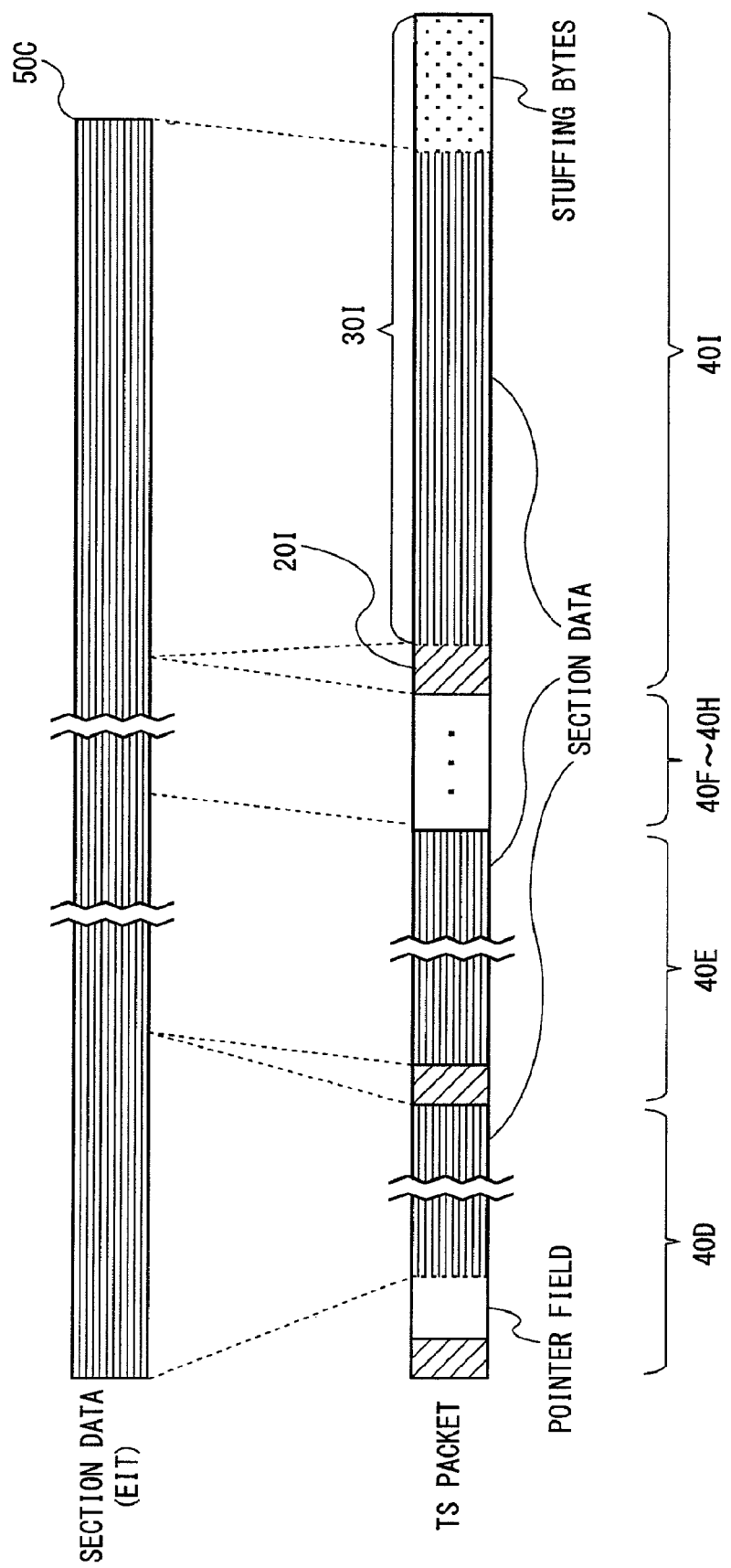
FIG. 7 shows structures of TS packets 40D to 40I that transmit an EIT 50C.

FIG. 7 shows structures of TS packets 40D to 40I that transmit an EIT 50C.

FIG. 7 shows an example in which the EIT 50C is transmitted by six TS packets 40D to 40I. In this example, the payloads of the first to fifth TS packets 40D to 40H are filled with data constituting the EIT 50C, but the payload 30I following the header 20I of the sixth TS packet 40I is adjusted to be the fixed length with use of stuffing bytes.

Note that, although not expressly depicted or described, since in general the size of the DSM-CC also is extremely large compared to the data size of the TS packet, the DSM-CC is divided into a plurality of TS packets, similarly to the EIT 50C.

Transmission Characteristics of TS Packets

The following describes transmission characteristics of TS packets that transmit the section data pieces.

The transmission interval of the TS packet that transmits the section data is different depending on the type of section data. The TS packet may be transmitted at a constant interval, or may be transmitted at two types of transmission interval.

Figure 8:
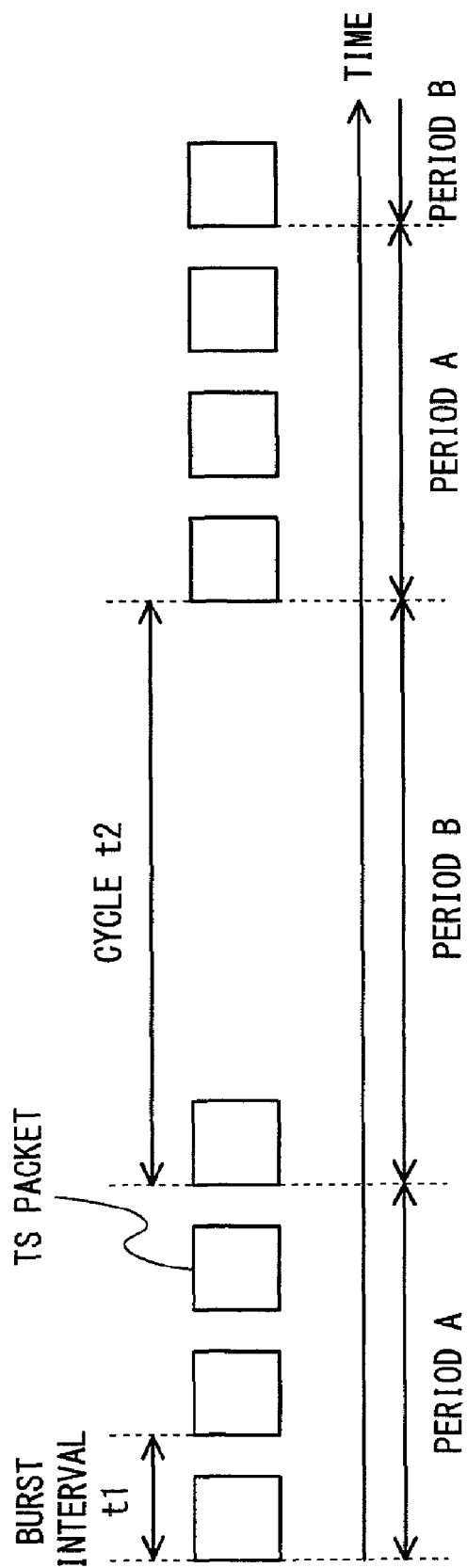
FIG. 8 illustrates a case of transmitting TS packets at two types of transmission interval.

FIG. 8 illustrates a case of transmitting TS packets at two types of transmission interval.

The squares in FIG. 8 indicate TS packets each transmitting a certain type of section data. In FIG. 8, there are two types of transmission interval (t1 and t2). A period A, in which TS packets are consecutively transmitted at a comparatively short transmission interval t1, and a period B, in which TS packets are consecutively transmitted at a transmission interval that is longer than t1, are repeated in alternation.

Hereinafter, t1 is referred to as a "burst interval", t2 is referred to as a "cycle", and the number of TS packets transmitted in the period A is referred to a "burst number". Note that the burst number in FIG. 8 is "3".

FIG. 9 shows exemplary burst numbers, burst intervals, and cycles of TS packets that transmit the types of section data.

FIG. 9 is constituted from sets each including a piece of section data 61, a burst number 62, a burst interval 63, and a cycle 64.

Here, the section data 61 indicates a name of a type of section data. The burst number 62 indicates a number of TS packets transmitted in the period A. The burst interval 63, in a case that the corresponding burst number 62 is larger than 1, indicates a transmission interval of two TS packets that are consecutively transmitted in the period A. The cycle 64 shows the time of the cycle B. Note that when the burst number 62 is "1", since a transmission interval of two TS packets consecutively transmitted in the period A cannot exist, the corresponding burst interval 63 is shown as "-".

For example, FIG. 9 shows that the burst number 62 of the TS packet that transmits the section data 61 "PAT" is "1" and the cycle 64 is "100 [msec]", and in other words, the TS packet that transmits the PAT is transmitted at a constant cycle of "100 [msec]".

Also, FIG. 9 shows that, for example, the burst number 62 of the TS packet that transmits the section data 61 "NIT" is "2", the burst interval 63 is "0.1 [msec] ", and the cycle 64 is "10,000 [msec]". In other words, two TS packets are transmitted in the period A at the interval of "0.1 [msec]", and the length of the interval B is "10,000 [msec]".

Structure

The following describes the structure of the buffer management apparatus 100.

Figure 2:
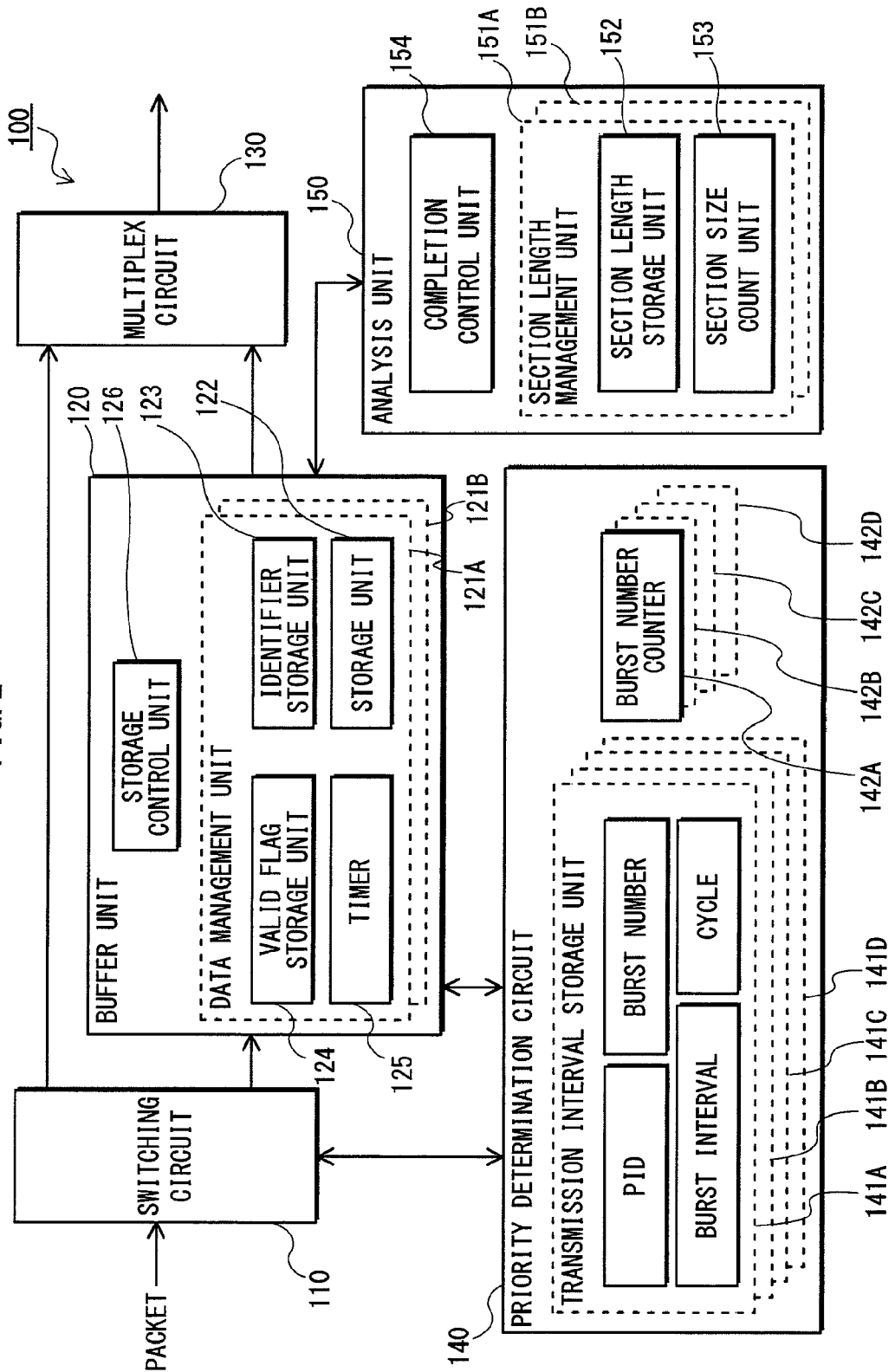
FIG. 2 is a functional block diagram of the buffer management apparatus 100 pertaining to an embodiment.

FIG. 2 is a functional block diagram of the buffer management apparatus 100.

As shown in FIG. 2, the buffer management apparatus 100 includes a switching circuit 110, a buffer unit 120, a multiplex circuit 130, a priority determination circuit 140, and an analysis unit 150.

Here, the switching circuit 110 has a function of switching between transmitting a received packet to the buffer unit 120, and transmitting a received packet to the multiplex circuit 130, according to the type of valid data of the received packet and control by the priority determination circuit 140.

The buffer unit 120 includes data management units 121A and 121B, and a storage control unit 126. In addition to storing valid data and PIDs of packets transmitted from the switching circuit 110 in one of the data management units (121A or 121B), the buffer unit 120 also, according to control by the priority determination circuit 140 and the analysis unit 150, transmits data stored in an instructed data storage unit (121A or 121B) to the multiplex circuit 130. Since all of the data management units have the same structure, the following describes the data management unit 121A.

The data management unit 121A stores valid data and PIDs of packets transmitted from the switching circuit 110, and includes a storage unit 122, an identifier storage unit 123, a valid flag storage unit 124, and a timer 125.

Here, the storage unit 122 is a buffer area for storing one type of valid data. The storage capacity of the storage unit 122 is required to be larger than a maximum size for the output unit 4 to burst transfer, and hereinafter is described as being double the maximum size for burst transfer (512 bytes).

The identifier storage unit 123 is realized by a register, etc. that stores PIDs indicating a type of data stored in the storage unit 122. The valid flag storage unit 124 is realized by a register, etc. that stores a flag indicating that data stored in the storage unit 122 is valid, that is, a flag indicating that the storage unit 122 is not unused.

For each storage of data in the storage unit 122, the timer 125 times an elapsed time from a time of being stored.

In accordance with PIDs stored in the identifier storage units 123 of the data management units and the PID of the transmitted packet, the storage control unit 126 determines whether to cause valid data of a packet transmitted from the switching circuit 110 to be stored in the storage unit 122 of the data storage unit 121A, or in the storage unit 122 of the data storage unit 121B. The determination method is described later.

Also, the storage control unit 126 causes the 256 bytes of data and the PID stored by the identifier storage unit 123 to be transmitted to the multiplex circuit 130 when the size of the data stored in the storage unit 122 of one of the data management units reaches a maximum size that can be burst transferred (256 bytes).

Also, the storage control unit 126 causes all data stored in the respective storage unit 122, and the PID stored in the respective identifier storage unit 123, of the data management unit (121A or 121B) indicated by the priority determination circuit 140 and the analysis unit 150, to be transmitted to the multiplex circuit 130.

The multiplex circuit 130 transmits, to the output unit 4, the valid data and the PID of the packet transmitted from the switching circuit 110 and the data and the PID transmitted from the buffer unit 120.

If data of different types from the valid data of the received packet is stored in the storage units 122 of both the data management units 121A and 121B, the priority determination circuit 140 judges whether to transmit the packet received by the switching circuit 110 to the buffer unit 120, or to transmit the packet to the multiplex circuit 130. The priority determination circuit 140 controls the switching circuit 110 and the buffer unit 120 according to the result of the judgment, and includes transmission interval storage units 141A to 141D and burst number counters 142A to 142D.

The transmission interval storage units 141 to 141D all have the same structure, and each is realized by a group of registers, etc. storing a PID, a burst number, a burst interval, and a cycle of a different type of section data. In the present example, a case is shown in which the PIDs, etc. of four types of section data can be stored. The burst numbers, burst intervals, and cycles stored by the transmission interval storage unit are, for example, the burst number 62, the burst interval 63, and the cycle 64 indicated in FIG. 9 for the respective corresponding types of section data.

Setting the data pieces in the transmission interval storage units is performed in advance, for example, by an administrator or the like of the buffer management apparatus 100, at an operation start time of the buffer management apparatus 100.

The burst number counters 142A to 142D all have the same structure, and are in one-to-one correspondence with the transmission interval storage units 141A to 141D. The burst number counters 142A to 142D each have a value of 0 in an initial state. When the burst number of one of the transmission interval storage units is larger than one, the corresponding burst number counter counts up by one each time the switching circuit 110 receives a packet including a PID matching the PID stored by the corresponding transmission interval storage unit, until reaching a burst number (maximum value) stored by the corresponding transmission interval storage unit. Upon reaching the maximum value, the burst number counter is initialized to the time of the switching circuit 110 next receiving the packet including the PID that is the same as the PID stored by the corresponding transmission interval storage unit, and the value is 1.

A judgment method used by the priority determination circuit 140 to judge whether to transmit the received packet to the buffer unit 120 or to the multiplex circuit 130 is described later. However, for each piece of valid data of a received packet and each piece of data stored in one of the storage units 122, a time until receiving a next piece of data of the same type is calculated according to data stored in the corresponding transmission interval storage unit and the corresponding burst number counter, etc. If the time until receiving the next piece of data of the same type as the valid data of the received packet is longest, the priority determination circuit 140 controls the switching circuit 110 to transmit the received packet to the multiplex circuit 130. Also, for example, if the time until receiving the next piece of data of the same type as data stored in the storage unit 122 of the data management unit 121A is longest, the buffer unit 120 is controlled to transmit the data stored in the storage unit 122 of the data management unit 121A and the PID stored in the identifier storage unit 123 to the multiplex circuit 130, and the switching circuit 110 is controlled to transmit the received packet to the buffer unit 120.

The analysis unit 150 includes section length management units 151A and 151B and a completion control unit 154.

The section length management units 151A and 151B have the same structure, and each corresponds to a different one of the data management units 121A and 121B. Hereinafter, the section length management unit 151A is described as corresponding to the data management unit 121A.

The section length management unit 151A includes a section length storage unit 152 and a section size count unit 153.

Here, the section length storage unit 152 stores a section length of the section data stored in the storage unit 122 of the data management unit 121A, and is realized by a register or the like.

The section size count unit 153 counts a size of section data transmitted until the present time and stored in the storage unit 122 of the data management unit 121A. Specifically, the section size count unit 153 is initialized each time a section length 52 is stored in the section length storage unit 152. The section size count unit 153 counts up a value corresponding to the size of the stored valid data each time valid data is stored in the storage unit 122 of the data management unit 121A.

The completion control unit 154 detects an origin of section data based on information such as the payload unit start indicator 22 included in the header of the packets transmitted from the switching circuit 110 to the buffer unit 120, and the pointer field included in the start of the valid data, extracts a section length 52 starting from the 13th bit from the origin of the section, and causes the extracted section length 52 to be stored in the section length storage unit 152 of the section length management unit (151A or 151B) corresponding to the data storage unit (121A or 121B) in which the valid data of the packet is stored.

Also, the completion control unit 154 judges whether the value of the section size count unit 153 matches the section length 52 stored in the section length storage unit 152, and if the judgment is affirmative, the completion control unit 154 controls the buffer unit 120 to transmit the data stored in the storage unit 122 of the data management unit 121A and the PID stored in the identifier storage unit 123 to the multiplex circuit 130.

Operation

The following describes the operation of a buffer management apparatus 100 that has the above-described structure and handles the above-described data.

Switching Circuit

Figure 10:
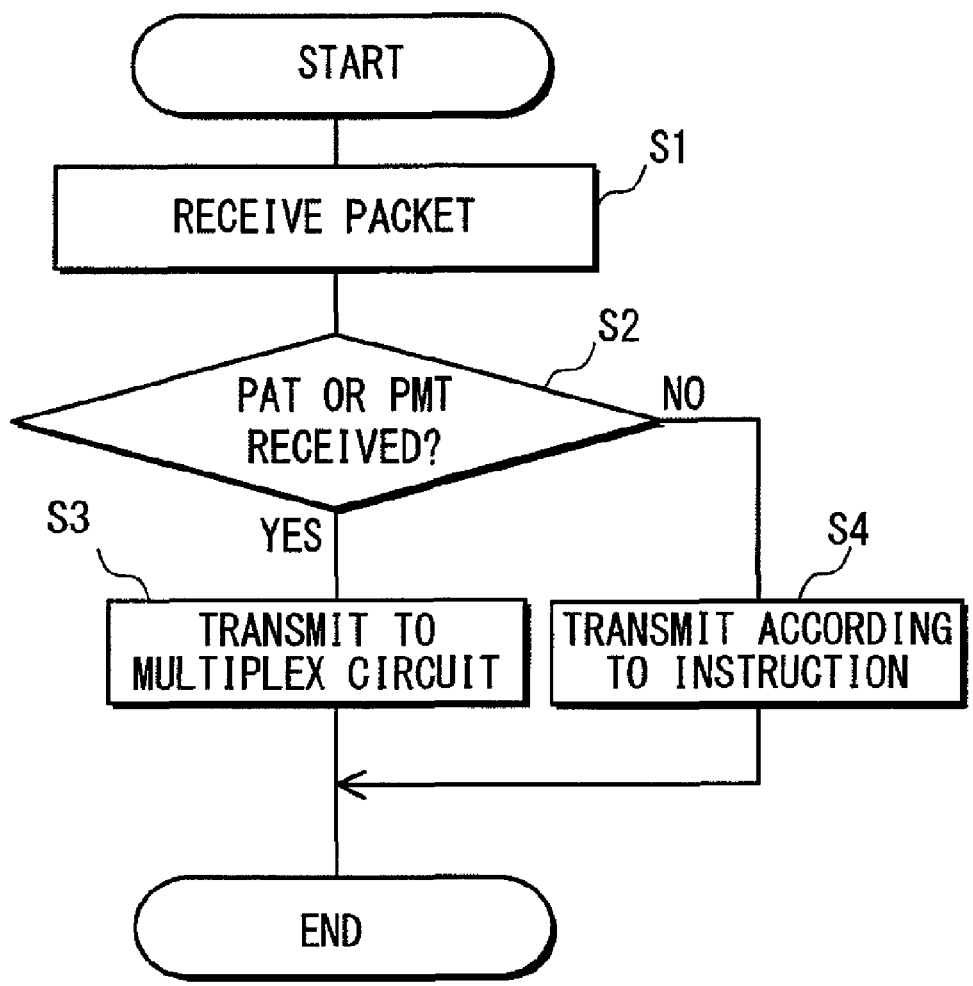
FIG. 10 is a flowchart showing operation of a switching circuit 110.

FIG. 10 is a flowchart showing the operation of the switching circuit 110.

Although the operation of the switching circuit 110 is described below with reference to the flowchart shown in FIG. 10, a case is described in which at the time of starting step S1, a PAT and a PMT have each been received once, respectively. Note that if the PAT and the PMT have not been received even once, upon receiving another type of section data, the switching circuit 110 transmits all of the received section data to the multiplex circuit 130.

The switching circuit 110, upon receiving a packet (step S1), judges whether the PID of the received packet matches the PID of PAT or PMT (step S2).

If the PID of the received packet matches the PID of either PAT or PMT (step S2: YES), the switching circuit 110 transmits the received packet to the multiplex circuit 130 (step S3), and ends the processing.

Meanwhile, in step S2, if the PID of the received packet does not match the PID of either PAT or PMT (step S2: NO), the switching circuit 110 transmits the received packet to the multiplex unit 130 or the buffer unit 120 according to an instruction from the priority determination circuit 140 (see steps S16 and S18 in FIG. 11), and ends the processing.

Priority Determination Circuit

Figure 11:
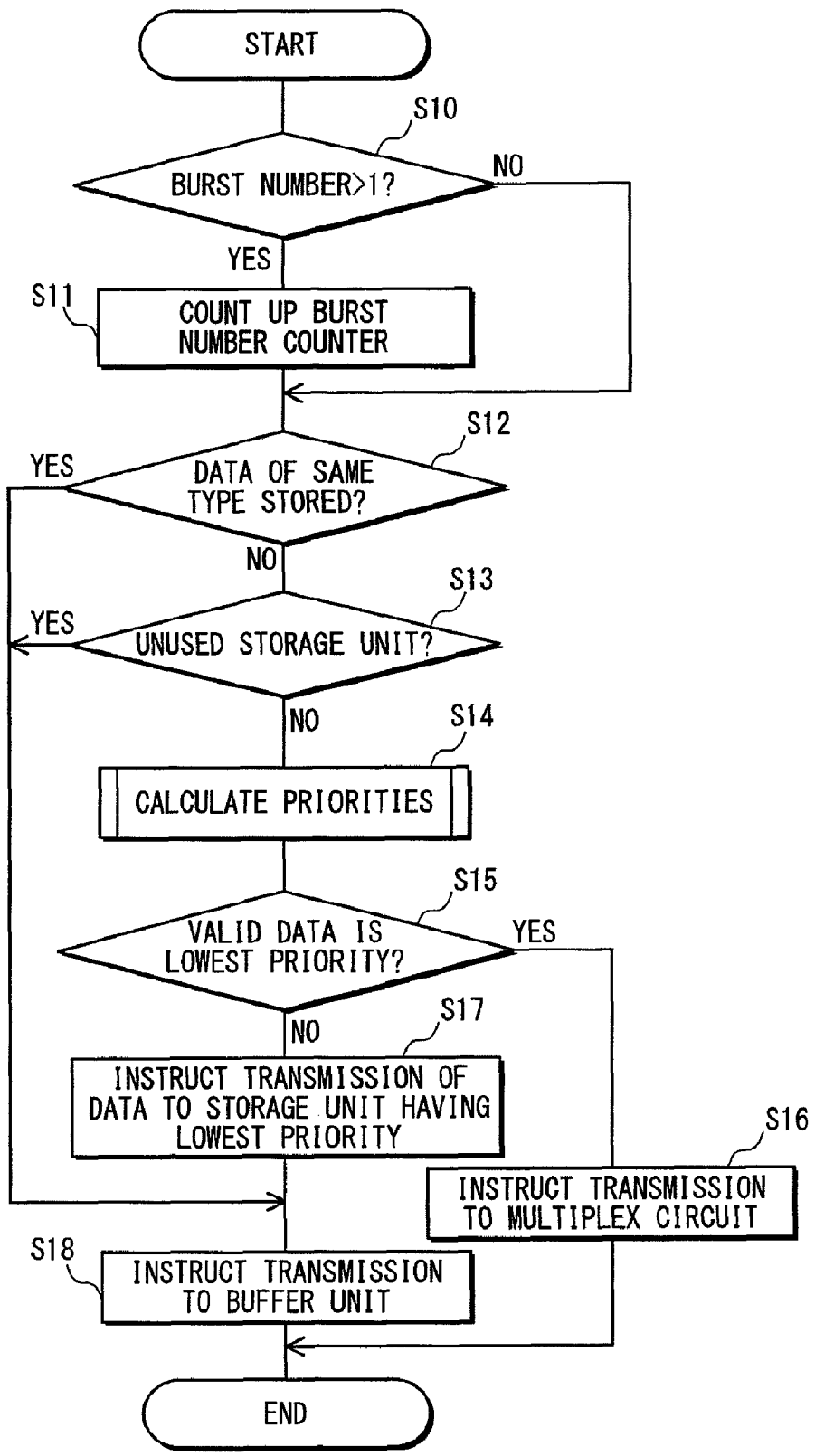
FIG. 11 is a flowchart showing operation of a priority determination circuit 140.

FIG. 11 is a flowchart showing the operation of the priority determination circuit 140.

The following describes the operation of the priority determination circuit 140 with reference to the flowchart in FIG. 11.

The priority determination circuit 140 judges whether the burst number stored in the transmission interval storage unit (one of 141A to 141D) that stores a PID matching the PID of the packet received by the switching circuit 110 in step S1 is larger than 1 (step S10).

If the stored burst number is larger than 1 (step S10: YES), the priority determination circuit 140 counts up the burst number counter corresponding to the transmission interval storage unit that stores that burst number (one of 142A to 142D) by 1 (step S11).

The priority determination circuit 140 performs the processing of step S11, or if the stored burst number in step S10 is 1 (step S10: NO), the priority determination circuit 140 judges whether data of the same type is stored, in the storage unit 122 of one of the data management units (121A or 121B) as the valid data of the packet received by the switching circuit 110 in step S1 (step S12). Specifically, if the PID stored by the identifier storage unit 123 of the data management unit (121A, 121B) matches the PID of the packet received by the switching circuit 110 in step S1, the priority determination circuit 140 judges that data of the same type as the valid data of the received packet is stored.

If data of the same type is not stored (step S12: NO), the priority determination circuit 140 judges whether there is an unused storage unit 122 (step S13). Specifically, if there is a data management unit (121A, 121B) for which the valid flag storage unit 124 is not "1", the priority determination circuit 140 judges that there is an unused storage unit 122.

If there is not an unused storage unit 122 (step S13: NO), the priority determination circuit 140 performs processing to calculate priorities for the valid data of the received packet and the data stored in the storage units 122 (step S14). The content of this processing is described later.

Following step S14, the priority determination circuit 140 judges whether the priority of the valid data of the received packet is the lowest (step S15), and if the priority of the valid data of the received packet is the lowest (step S15: YES), the priority determination circuit 140 instructs the switching circuit 110 to transmit the received packet to the multiplex circuit 130 (step S16), and ends the processing.

Meanwhile, if the priority of the valid data of the received packet is not the lowest (step S15: NO), the priority determination circuit 140 instructs the buffer unit 120 to transmit the data stored in the storage unit 122, and the PID stored in the identifier storage unit 123, of the data management unit (121A or 121B) that has the lowest priority (step S17), instructs the switching unit 110 to transmit the received packet to the buffer unit 120 (step S18), and ends the processing. Note that to perform the instruction of step S17, the priority determination circuit 140 transmits the PID stored in the identifier storage unit 123 to be transmitted to the buffer unit 120.

Also, in step S12, if data of the same type is stored (step S12: YES) and in step S13, there is an unused storage unit 122 (step S13: YES), the priority determination circuit 140 instructs the switching circuit 110 to transmit the received packet to the buffer unit 120 (step S18), and ends the processing.

Priority Calculation

Figure 12:
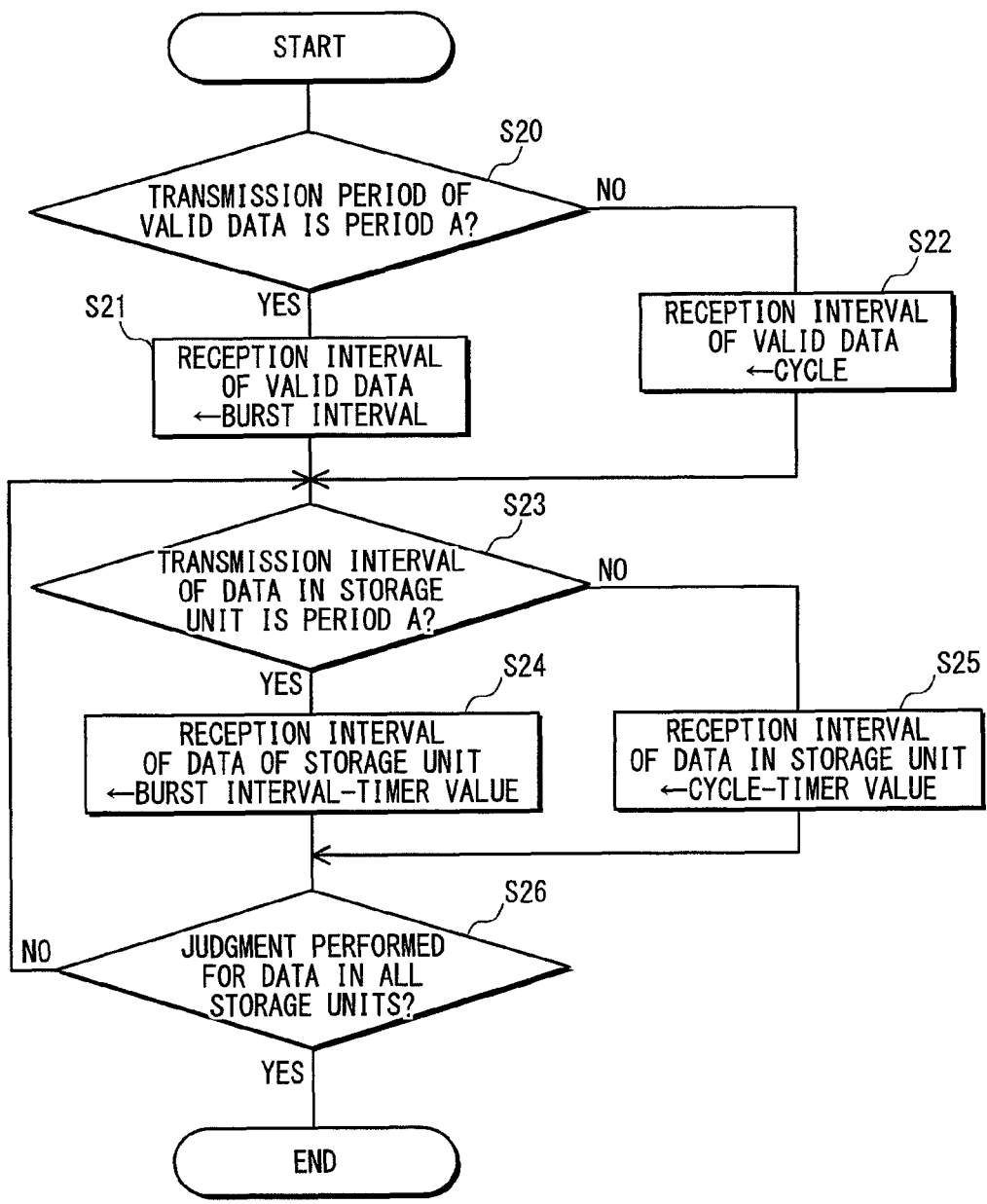
FIG. 12 is a flowchart showing priority calculation processing performed by the priority determination circuit 140.

FIG. 12 is a flowchart showing priority calculation processing performed by the priority determination circuit 140.

The following describes the priority calculation processing of step S14 in FIG. 11 with reference to the flowchart in FIG. 12.

The priority determination circuit 140 judges whether the transmission period of the packet received by the switching circuit 110 is period A (see FIG. 8) (step S20 in FIG. 12). Specifically, the priority determination circuit 140 judges that the transmission period of the received packet is period A if the burst number stored by the transmission interval storage unit (one of 141A to 141D) that stores a PID that is identical to the PID of the packet received by the switching circuit 110 is larger than 1, and the burst number counter corresponding to the transmission interval storage unit (one of 142A to 142D) is less than the burst number.

If the transmission period of the packet received by the switching circuit 110 is period A (step S20: YES), the priority determination circuit 140 sets the burst interval stored by the transmission interval storage unit (one of 141A to 141D) that stores a PID that is identical to the PID of the packet received by the switching circuit 110 as a reception interval until receiving a next piece of data of a same type as the valid data of the packet (step S21).

Meanwhile, if the transmission period of the packet received by the switching circuit 110 is not period A (step S20: NO), the priority determination circuit 140 sets, as the reception interval until receiving a next piece of data of a same type as the valid data of the packet, the cycle stored by the transmission interval storage unit (one of 141A to 141D) that stores the PID that is identical to the PID of the packet received by the switching circuit 110 (step S22).

Following the processing of step S21 or step S22, the priority determination circuit 140 judges whether the transmission period of data stored in the storage unit 122 of one of the data management units (121A or 121B) is period A (step S23). Specifically, the priority determination circuit 140 judges that the transmission period is period A if the burst number stored by the transmission interval storage unit (one of 141A to 141D) that stores a PID that is identical to the PID stored by the identifier storage unit of the data management unit is larger than 1, and the burst number counter corresponding to the transmission interval storage unit (one of 142A to 142D) is less than the burst number. Note that in the embodiments, this judgment is performed first on the data stored in the storage unit 122 of the data management unit 121A.

If a judgment is made in step S23 that the transmission period for data stored in the storage unit 122 of one data management unit is period A (step S23: YES), the priority determination circuit 140 sets, as the reception interval until receiving the next piece of data of the same type as the data stored in the storage unit 122, a time obtained by subtracting the time measured by the timer 125 of the data management unit from the burst interval stored by the transmission interval storage unit (one of 141A to 141D) that stores a PID that is identical to the PID stored by the identifier storage unit 123 of the data storage unit (step S24).

Meanwhile, if a judgment is made in step S23 that the transmission period for data stored in the storage unit 122 of one data management unit is not period A (step S23: NO), the priority determination circuit 140 sets, as the reception interval until receiving the next piece of data of the same type as the data stored in the storage unit 122, a time obtained by subtracting the time measured by the timer 125 of the data management unit from the cycle stored by the transmission interval storage unit (one of 141A to 141D) that stores a PID that is identical to the PID stored by the identifier storage unit 123 of the data storage unit (step S25).

Following the processing of either step S24 or step S25, the priority determination circuit 140 judges whether the judgment of step S23 has been performed for the data in both of the storage units (the storage unit 122 of the data management unit 121A and storage unit 122 of the data management unit 121B) (step S26).

If the judgment has not been performed for the data in the storage unit 122 of the data management unit 121B (step S26: NO), the priority determination circuit 140 performs processing again from step S23, and if the judgment has been performed for the data in the storage unit 122 of the data management unit 121B (step S26: YES), the priority determination circuit 140 ends the processing.

Buffer Unit

Figure 13:
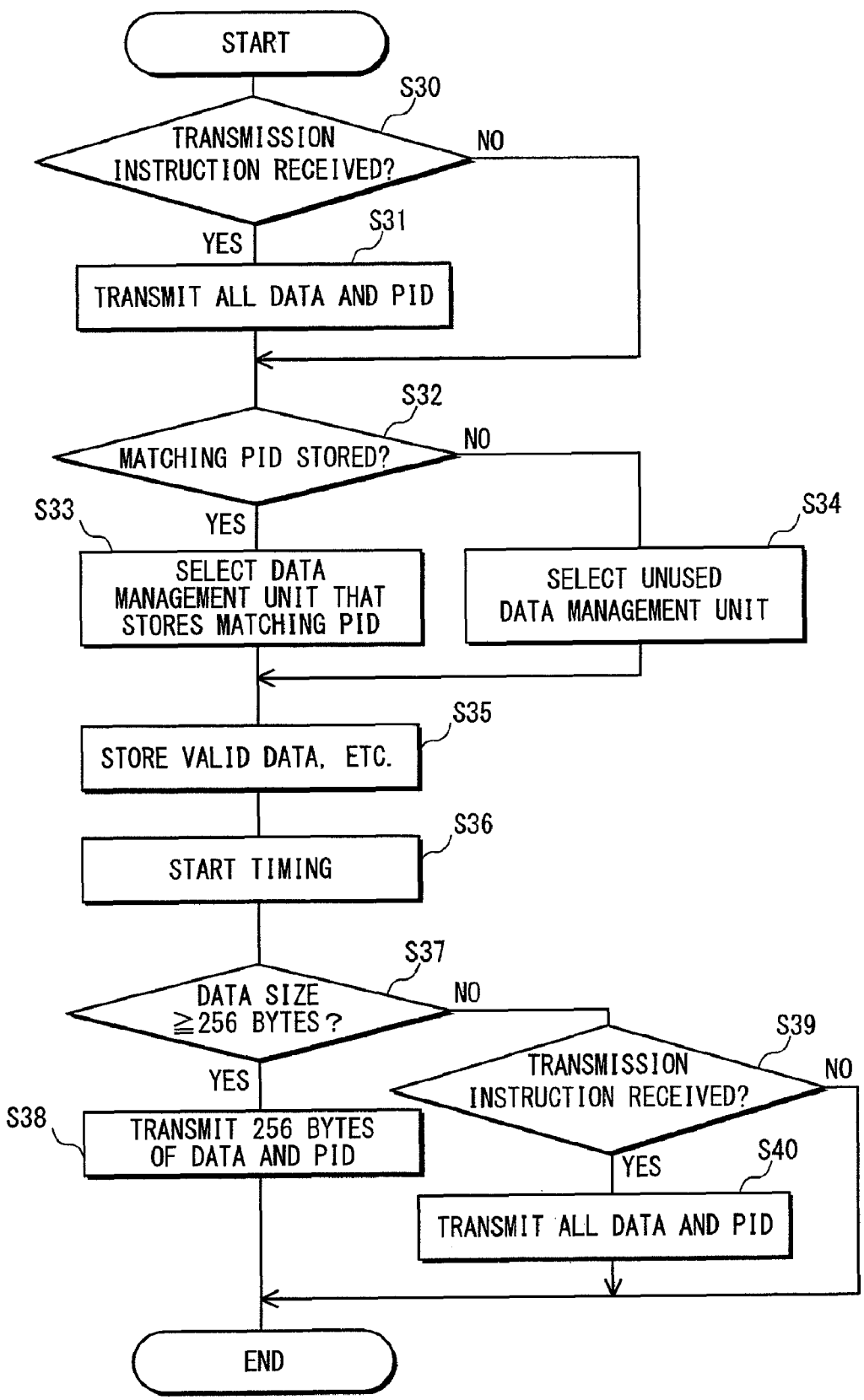
FIG. 13 is a flowchart showing operation of a buffer unit 120.

FIG. 13 is a flowchart showing operation of the buffer unit 120.

The operation of the buffer unit 120 is described below with reference to the flowchart shown in FIG. 13, and the processing in the following description is executed when the packet is received from the switching circuit 110.

The storage control unit 126 of the buffer unit 120 judges whether a transmission instruction (see step S17 in FIG. 11) has been received from the priority determination circuit 140

(step S30), and if a transmission instruction has been received (step S30: YES), transmits, to the multiplex circuit 130, all of the data stored in the storage unit 122 of the instructed data management unit (121A or 121B) and the PID stored in the identifier storage unit 123 of the instructed data management unit (step S31) Note that at this time, the storage control unit 126 sets the valid flag storage unit 124 of the instructed data management unit to "0".

Following step S31, or if a transmission instruction has not been received in step S30 (step S30: NO), the storage control unit 126 judges whether a PID that matches the PID of the packet transmitted from the switching circuit 110 is stored in the identifier storage unit 123 of one of the data management units 121A or 121B (step S32).

If a PID that matches the PID of the packet transmitted from the switching circuit 110 is stored (step S32: YES), the storage control unit 126 selects the data management unit (121A or 121B) that includes the identifier storage unit 123 in which the matching PID is stored (step S33), and if a PID that matches the PID of the packet transmitted from the switching circuit 110 is not stored (step S32: NO), the storage control unit 126 selects the data management unit for which the valid flag storage unit 124 is not "1" (the unused data management unit) (step S34).

The storage control unit 126 causes the valid data of the packet transmitted from the switching circuit 110 to be stored in the storage unit 122 of the data management unit selected in step S33 or step S34 (step S35). Note that when causing valid data to be stored in the storage unit 122 of the data management unit selected in step S34, the storage control unit 126 causes the PID of the packets transmitted from the switching circuits 110 to be stored in the identifier storage unit 123, and "1" to be stored in the valid flag storage unit 124, of the selected data management unit.

Also, the storage control unit 126 starts timing after initializing the value of the timer 125 of the data management unit selected in step S33 or step S34 to "0" (step S36).

The storage control unit 126 judges whether the size of the data stored in the storage unit 122 in which valid data was caused to be stored in step S35 is greater than or equal to 256 bytes (step S37), and if the size is greater than or equal to 256 bytes (step S37: YES), causes the 256 bytes of data stored in the storage unit 122 and the PID stored in the identifier storage unit 123 of the data management unit that includes that storage unit 122 to be transmitted to the multiplex circuit 130 (step S38).

Meanwhile, if the size of the data stored in the storage unit 122 in which valid data was caused to be stored in step S35 is less than 256 bytes (step S37: NO), the storage control unit 126 judges whether a transmission instruction has been received from the analysis unit 150 (see step S45 in FIG. 14) (step S39).

If a transmission instruction has been received from the analysis unit 150 (step S39: YES), the storage control unit 126 causes all of the data stored in the instructed storage unit 122 and the PID stored in the identifier storage unit 123 of the data management unit that includes the instructed storage unit 122 to be transmitted to the multiplex circuit 130 (step S40), and ends the processing. Note that when step S40 has been performed, the storage control unit 126 sets the valid flag storage unit 124 of the instructed data management unit to "0".

Also, if a transmission instruction has not been received from the analysis unit 150 (step S39: NO), the storage control unit 126 ends the processing.

Analysis Unit

Figure 14:
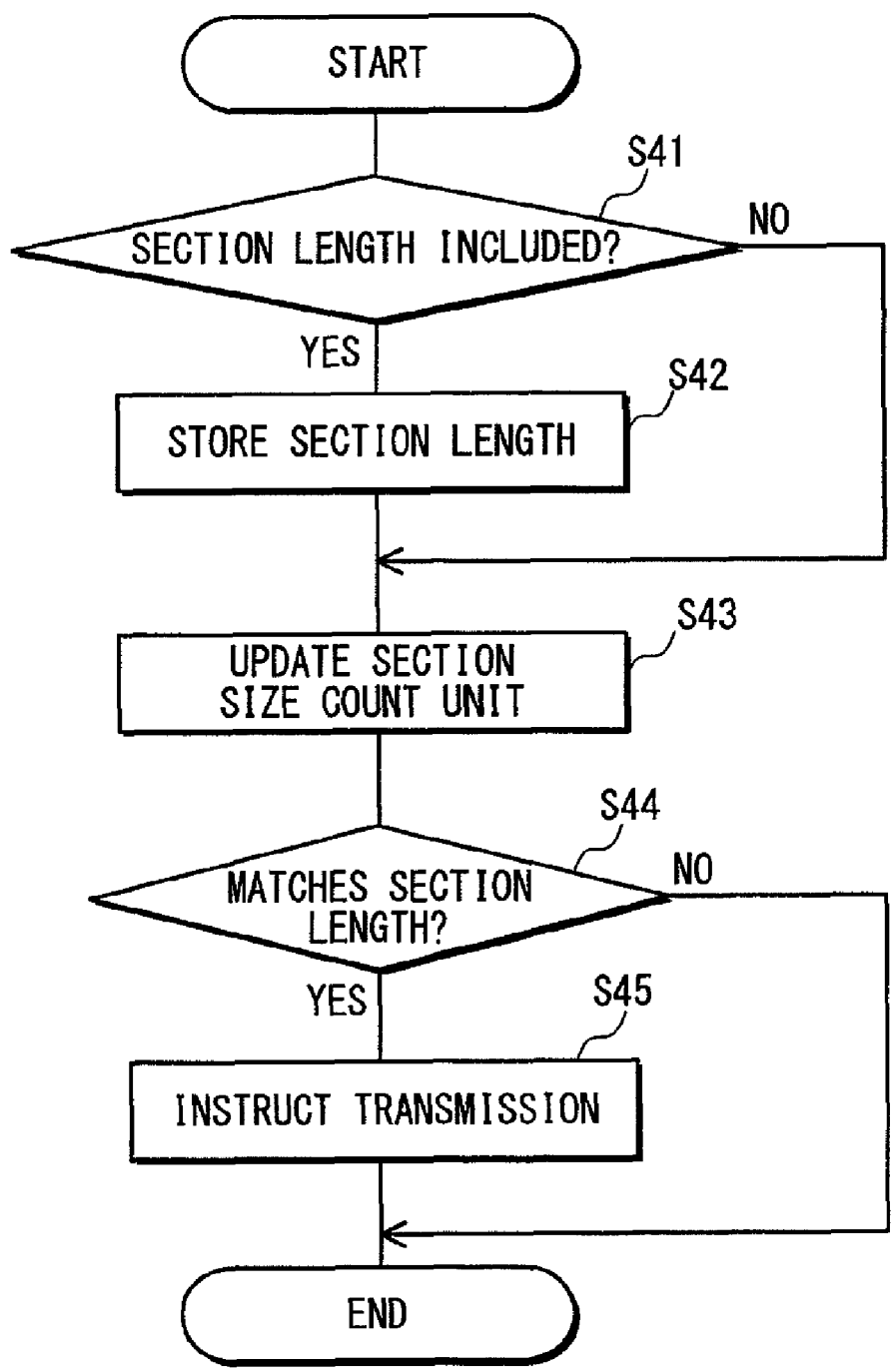
FIG. 14 is a flowchart showing operation of an analysis unit 150.

FIG. 14 is a flowchart showing the operation of the analysis unit 150.

The following describes the operation of the analysis unit 150 with reference to the flowchart in FIG. 14.

The completion control unit 154 of the analysis unit 150 judges whether a section length 52 is included in the packet transmitted to the buffer unit 120 (step S41). If the section length 52 is included (step S41: YES), the completion control unit 154 extracts the section length 52, and stores the section length 52 in the section length storage unit 152 of the section length management unit (151A or 151B) corresponding to the data management unit (121A or 121B) in which the valid data of the transmitted packet is stored (step S42). Note that at this time, the completion control unit 154 causes the value of the section size count unit 153 of the corresponding section length management unit (151A or 151B) to be initialized to "0".

After the processing of step S42 is performed, or if the section length 52 is not included in the packet transmitted from the buffer 120 (step S41: NO), the section size count unit 153 of the section length management unit (151A or 151B) corresponding to the data management unit (121A or 121B) in which the valid data of the transmitted packet is stored counts up the size worth of the stored valid data (step S43).

The completion control unit 154 judges whether the value of the section size count unit 153 that has been counted up in step S43 matches the section length 52 stored by the section length storage unit 152 of the section length management unit (151A or 151B) that includes the section size count unit 153 (step S44).

If the value of the section size count unit 153 matches the section length 52 stored by the section length storage unit 152 (step S44: YES), the completion control unit 154 instructs the transmission of data stored in the data management unit (121A or 121B) corresponding to the section length management unit (151A or 151B) in which the section size count unit 153 (step S45) is included, and ends the processing.

Also, if the value of the section size count unit 153 does not match the section length 52 stored by the section length storage unit 152 (step S44: NO), the completion control unit 154 ends the processing.

DESCRIPTION USING SPECIFIC EXAMPLES

First Specific Example

Figure 15:
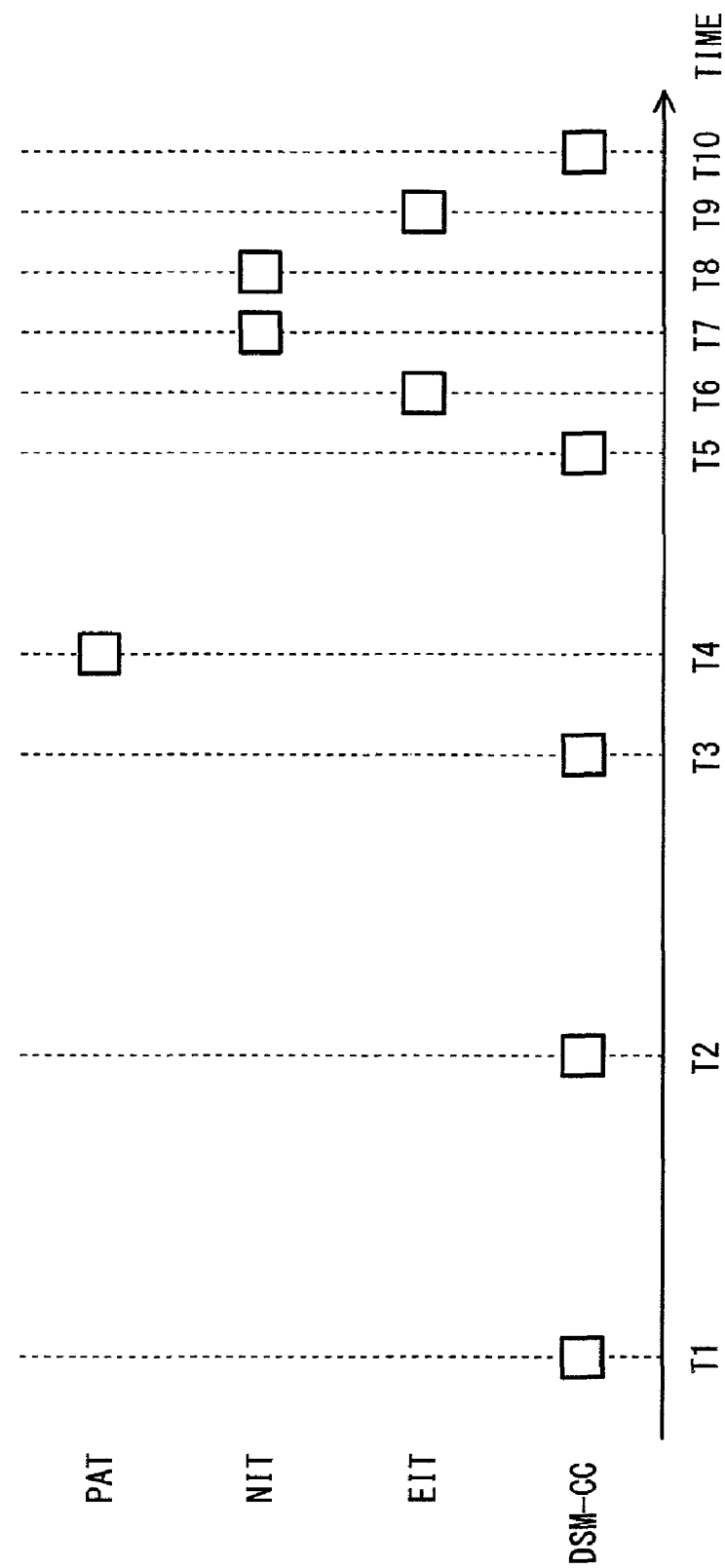
FIG. 15 shows a first example of an order of receiving packets that transmit each type of section data.

FIG. 15 shows an example of receiving packets that transmit different types of section data.

The following describes the operation of the entire buffer management apparatus 100 with use of an example of receiving the packets at the timings shown in FIG. 15.

Note that the size of PAT is "25 bytes", the size of NIT is "200 bytes", the size of EIT is "1000 bytes", and the size of DSM-CC is "1000 bytes". The burst number 62, the burst interval 63, and the cycle 64 of the PAT shown in FIG. 9 are stored in the transmission interval storage unit 141 along with the PID of the PAT, and similarly the burst numbers 62, etc. of the NIT, the EIT, and the DMS-CC shown in FIG. 9 are described as being stored in the transmission interval storage units 141B to 141D, respectively. Also, the PAT is mapped to a TS packet as shown in FIG. 5, the NIT is mapped to a TS packet as shown in FIG. 6, and the DSM-CC is mapped to a TS packet as shown in FIG. 7.

Also, at the start point described below, the storage units 122 of the buffer management apparatus 100 are unused (the values in the valid flag storage units 124 are "0").

T1

At the time T1 (0 msec), the switching circuit 110 receives a DSM-CC packet (steps S1, S2: NO in FIG. 10), and according to an instruction from the priority determination circuit 140, transmits the packet to the buffer unit 120 (step S4).

Specifically, since the burst number of the DSM-CC packet is 1 (step S10: NO in FIG. 11), the priority determination circuit 140 does not perform the processing of step S11 (counting up the burst number counter 142A), and when data of the same type is not stored (step S12: NO), since there is an unused storage unit 122 (step S13: YES), instructs transmission of the DSM-CC packet to the buffer unit 120 (step S18).

Since a transmission instruction has not been received from the priority determination circuit 140 (step S30: NO in FIG. 13), since a PID that matches the PID of the transmitted packet is not stored (step S32: NO), the storage control unit 126 of the buffer unit 120 selects the unused data management unit (in the present example, the data management unit 121A) (step S34), stores the valid data (divided DSM-CC data) of the packet, the PID, and "1", respectively, in the storage unit 122, the identifier storage unit 123, and the valid flag storage unit 124 of the data management unit 121A (step S35), and after initializing the timer 125 of the data management unit 121A, starts timing (step S36).

Also at this time, since the section length 52 is included in the DSM-CC packet (step S41: YES in FIG. 14), the completion control unit 154 of the analysis unit 150 stores the section length 52 in the section length storage unit 152 of the section length management unit 151A (step S42), and after initializing the value of the section size count unit 153 to "0", counts up the section size count unit 153 by the amount of the data size stored in the storage unit 122 of the data management unit 121A (step S43), and the analysis unit 150 ends the processing (step S44: NO).

Also, since the size of the data stored by the storage unit 122 of the data management unit 121A is less than 256 bytes (step S37: NO in FIG. 13), and a transmission instruction has not been received from the analysis unit 150 (step S39: NO), the storage control unit 126 of the buffer unit 120 ends the processing.

T2

At the time T2 (3 msec), the switching circuit 110 receives a DSM-CC packet (steps S1, S2: NO in FIG. 10), and transmits the packet to the buffer unit 120 according to the instruction from the priority determination circuit 140 (step S4).

Specifically, since the burst number of the DSM-CC packet is 1 (step S10: NO in FIG. 11), the priority determination circuit 140 does not perform the processing of step S11 (counting up the burst number counter 142A), and since data of the same type is stored (step S12: YES), instructs the switching circuit 110 to transmit the DSM-CC packet to the buffer unit 120 (step S18).

Since a transmission instruction has not been received from the priority determination circuit 140 (step S30: NO in FIG. 13), and a PID is stored that matches the PID of the transmitted packet (step S32: YES), the storage control unit 126 of the buffer unit 120 selects the data management unit 121A (step S33), stores the valid data (divided DSM-CC data) of the transmitted packet in the storage unit 122 of the data management unit 121A (step S35), and after initializing the timer 125 of the data management unit 121A, starts timing (step S36).

Also at this time, since the section length 52 is not included in the DSM-CC packet (step S41: NO in FIG. 14), the completion control unit 154 of the analysis unit 150 counts up the section size count unit 153 by the amount of the data size stored in the storage unit 122 of the data management unit 121A (step S43), and the analysis unit 150 ends the processing (step S44: NO).

Also, since the size of the data stored in the storage unit 122 of the data management unit 121A is greater than or equal to 256 bytes (step S37: YES in FIG. 13), the storage control unit 126 of the buffer unit 120 transmits, to the multiplex circuit 130, the 256 bytes of data from the start of the data stored in the storage unit 122 and the PID stored in the identifier storage unit 123 of the data management unit 121A (step S38), and ends the processing.

T3

At the time T3 (6 msec), the switching circuit 110 receives the DSM-CC packet (steps S1, S2: NO in FIG. 10). Thereafter, similarly to the time T2, the valid data (DSM-CC divided data) is stored in the storage unit 122 of the data management unit 121A, and the 256 bytes of data from the start of the data stored in the storage unit 122 and the PID stored in the identifier storage unit 123 of the data management unit 121A are transmitted to the multiplex circuit 130.

T4

At the time T4 (7 msec), since the switching circuit 110 receives a PAT packet (steps S1, S2: YES in FIG. 10), the switching circuit 110 transmits the packets to the multiplex circuit 130 (step S3). In other words, the PAT packets are not buffered.

T5

At the timing T5 (9 msec), the switching circuit 110 receives the DSM-CC packet (steps S1, S2: NO in FIG. 10), and thereafter, similarly to the case of the time T2, the valid data (DSM-CC divided data) is stored in the storage unit 122 of the data management unit 121A. However, since the size of the data stored in the storage unit 122 of the data management unit 121A is less than 256 bytes (step S37: NO in FIG. 13), and a transmission instruction has not been received from the analysis unit 150 (step S39: NO), transmission from the buffer unit 120 to the multiplex circuit 130 is not performed.

T6

At the time T6 (10.1 msec), the switching circuit 110 receives an EIT packet (steps S1, S2: NO in FIG. 10), and the switching circuit 110, in accordance with an instruction by the priority determination circuit 140, transfers the packet to the buffer unit 120 (step S4).

Specifically, since the burst number of the EIT packet is 2 (step S10: YES in FIG. 11), the burst number counter 142C reaches "1" (step S11), data of the same type is not stored (step S12: NO), and there is an unused storage unit 122, (step S13: YES), the priority determination circuit 140 instructs transmission of the EIT packet to the buffer unit 120 (step S18).

Since a transmission instruction has not been received from the priority determination circuit 140 (step S30: NO in FIG. 13) and a PID that matches the PID of the transmitted packet is not stored (step S32: NO), the storage control unit 126 of the buffer unit 120 selects the unused data management unit 121B (step S34), stores the valid data (EIT section divided data), the PID, and "1" of the transmitted packet respectively in the storage unit 122, the identifier storage unit 123, and the valid flag storage unit 124 of the data management unit 121B (step S35), and after initializing the timer 125 of the data management unit 121B, starts timing (step S36).

Also at this time, since a section length 52 is included in the EIT packet (step S41: YES in FIG. 14), the completion control unit 154 of the analysis unit 150 stores the section length 52 in the section length storage unit 152 of the section length management unit 151B (step S42), initializes the value of the section size count unit 153 to "0", and counts up the section size count unit 153 by the amount of the data size stored in the storage unit 122 of the data management unit 121B (step S43), and the analysis unit 150 ends the processing (step S44: NO).

Also, since the size of the data stored in the storage unit 122 of the data management unit 121B is less than 256 bytes (step S37: NO in FIG. 13), and a transmission instruction has not been received from the analysis unit 150 (step S39: NO), the storage control unit 126 of the buffer unit 120 ends the processing.

T7

At the time T7 (10.5 msec), the switching circuit 110 receives an NIT packet (steps S1, S2: NO in FIG. 10), and transmits the packet to the buffer unit 120 in accordance with an instruction from the priority determination circuit 140 (step S4).

Specifically, since the burst number of the NIT packet is 2 (step S10: YES in FIG. 11), the burst number counter 142B reaches "1" (step S11), data of the same type is not stored (step S12: NO), and there is also not an unused storage unit 122 (step S13: NO), the priority determination circuit 140 performs priority calculation processing (step S14).

That is to say, since the burst number of the NIT packet is larger than 1, and the value of the burst number counter 142B is "1" which is less than the burst number, the priority determination circuit 140 judges that the transmission interval of the NIT packet is period A (step S20: YES), and sets the NIT reception interval as the burst interval "0.1 msec" (step S21).

Also, since the burst number of the data (DMS-CC) stored in the storage unit 122 of the data management unit 121A is "1", the priority determination circuit 140 judges that the transmission period of the DMS-CC packet is not period A (step S23: NO), and sets the DMS-CC reception interval to the time "1.5 msec" obtained by subtracting the value of the timer 125 "1.5 msec" (the elapsed time from the time T5) from the cycle "3 msec" (step S25).

Also, since the burst number "2" of the data (EIT) stored in the storage unit 122 of the data management unit 121B is larger than "1", and the value of the burst number counter 142C is "1" which is less than the burst number, the priority determination circuit 140 judges that the transmission period of the EIT packet is period A (step S23: YES), and sets, as the EIT reception interval, a time of "0.6 msec" obtained by subtracting the value of the timer 125 "0.4 msec" (elapsed time from the time T6) from the burst interval "1 msec" (step S24).

Since the priority of the NIT is not the lowest (step S15: NO), the priority determination circuit 140 instructs the buffer unit 120 to transmit the data (DSM-CC) stored in the storage unit 122 of the data management unit 121A, which has the lowest priority, and the PID stored in the identifier storage unit 123 of the data management unit 121A (step S17), and instructs the switching circuit 110 to transmit the received packet to the buffer unit 120 (step S18). Note that to instruct the buffer unit 120, the priority determination circuit 140 transmits the PID of the DSM-CC to the buffer unit 120.

Since a transmission instruction has been received from the priority determination circuit 140 (step S30: YES in FIG. 13), the storage control unit 126 of the buffer unit 120 transmits the data (DSM-CC) stored in the storage unit 122 of the data management unit 121A and the PID stored in the identifier storage unit 123 to the multiplex circuit 130 (step S31), and sets the valid flag storage unit 124 of the data management unit 121A to "0".

Also, since a PID that matches the PID of the transmitted packet is not stored (step S32: NO in FIG. 13), the storage control unit 126 selects the unused data management unit 121A (step S34), stores the valid data (NIT divided data) of the transmitted packet, the PID, and "1" in the storage unit 122, the identifier storage unit 123, and the valid flag storage unit 124 of the data management unit 121A, respectively (step S35), and after initializing the timer 125 of the data management unit 121A, starts timing (step S36).

Also, since the section length 52 is included in the NIT packet (step S41: YES in FIG. 14), the completion control unit 154 of the analysis unit 150 stores the section length 52 in the section length storage unit 152 of the section length management unit 151A (step S42), and after initializing the value of the section size count unit 153 to "0", counts up the section size count unit 153 by the amount of the data size stored in the storage unit 122 of the data management unit 121A (step S43), and the analysis unit 150 ends the processing (step S44: NO).

Also, since the size of the data stored in the storage unit 122 of the data management unit 121A is less than 256 bytes (step S37: NO in FIG. 13), and a transmission instruction has not been received from the analysis unit 150 (step S39: NO), the storage control unit 126 of the buffer unit 120 ends the processing.

T8

At time T8 (10.6 msec), the switching circuit 110 receives the NIT packet (steps S1, S2: NO in FIG. 10), and the switching circuit 110 transmits the packet to the buffer unit 120 according to the instruction of the priority determination circuit 140 (step S4).

Specifically, since the burst number of the NIT packet is 2 (step S10: YES in FIG. 11), the burst number counter 142C reaches "2" (step S11), and since data of the same type is stored (step S12: YES), the priority determination circuit 140 instructs the switching circuit 110 to transmit the NIT packet to the buffer unit 120 (step S18).

Since the storage control unit 126 of the buffer unit 120 has not received a transmission instruction from the priority determination circuit 140 (step S30: NO in FIG. 13), and a PID that matches the PID of the transmitted packet is stored (step S32: YES), the storage control unit 126 of the buffer unit 120 selects the data management unit 121A (step S33), stores the valid data (NIT section divided data) of the transmitted packet in the storage unit 122 of the data management unit 121A (step S35), and after initializing the timer 125 of the data management unit 121A, starts timing (step S36).

Also at this time, since the section length 52 is not included in the NIT packet (step S41: NO in FIG. 14), the completion control unit 154 of the analysis unit 150 counts up the section size count unit 153 by the amount of the data size stored in the storage unit 122 of the data management unit 121A (step S43), and since the value of the section size count unit 153 counted up in step S43 matches the section length 52 stored by the section length storage unit 152 of the section length management unit (151A) including the section size count unit 153 (step S44: YES), the completion control unit 154 instructs the buffer unit 120 to transmit the data (NIT) stored in the storage unit 122 of the data management unit 121A and the PID stored in the identifier storage unit 123 of the data management unit 121A (step S45).

Also, although the size of the data stored in the storage unit 122 of the data management unit 121A is less than 256 bytes (step S37: NO in FIG. 13), since a transmission instruction has not been received from the analysis unit 150 (step S39: YES), the storage control unit 126 of the buffer unit 120 transmits data (NIT) stored in the storage unit 122 of the data management unit 121A and the PID stored in the identifier storage unit 123 of the data management unit 121A to the multiplex circuit 130 (step S40) Note that at this time, the valid flag storage unit 124 of the data management unit 121A is set to "0".

T9

At the time T9 (11.1 msec), the switching circuit 110 receives an EIT packet (steps S1, S2: NO in FIG. 10), and thereafter, processing is performed similarly to the case of the time T2, the valid data (EIT divided data) is stored in the storage unit 122 of the data management unit 121B, and the 256 bytes of data from the start of the data stored in the storage unit 122 and the PID stored in the identifier storage unit 123 of the data management unit 121A are transmitted to the multiplex circuit 130.

T10

At the time T10 (12 msec), the switching circuit 110 receives the DSM-CC packet (steps S1, S2: NO in FIG. 10), and thereafter, basically the same processing is performed as the processing at time T1, valid data (DSM-CC divided data) is stored in the unused storage unit 122 of the data management unit 121A, and since the size of the data stored in the storage unit 122 of the data management unit 121A is less than 256 bytes (step S37: NO in FIG. 13), and a transmission instruction has not been received from the analysis unit 150 (step S39: NO), transmission from the buffer unit 120 to the multiplex circuit 130 is not performed.

Second Specific Example

Figure 16:
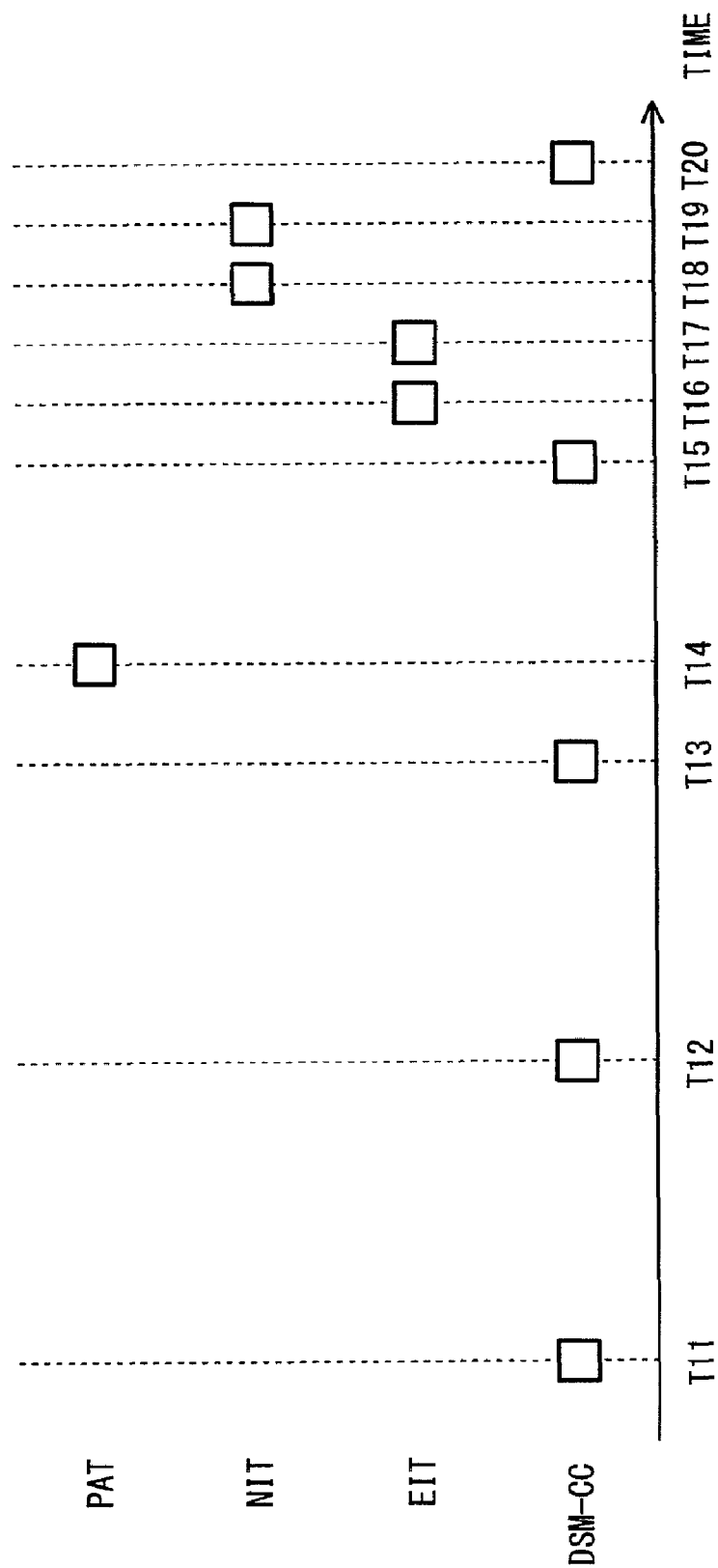
FIG. 16 shows a second example of an order of receiving packets that transmit each type of section data.

FIG. 16 shows an example of receiving packets that transmit different types of section data.

Hereinafter, as shown in FIG. 16, the operation of the entire buffer management apparatus 100 is described using an example of a case in which the packets are received at different timings from the timings shown in FIG. 15.

Note that the conditions of size, etc. of the types of section data are similar to the conditions described in the first specific example (FIG. 15).

Since the operation from time T11 to T16 in FIG. 16 is the same as the operation from T1 to T6 in FIG. 15, the following describes the operation from time T17 onward.

At time T17 (11.1 msec), the switching circuit 110 receives an EIT packet (steps S1, S2: NO in FIG. 10), and thereafter, the same processing is performed as the processing at time T9, the valid data (EIT divided data) is stored in the storage unit 122 of the data management unit 121B, and the 256 bytes of data from the start of the data stored in the storage unit 122, and the PID stored in the identifier storage unit 123 of the data management unit 121A are transmitted to the multiplex circuit 130.

T18

At time T18 (11.5 msec), the switching circuit 110 receives an NIT packet (steps S1 and S2: NO in FIG. 10), and transmits the packet to the buffer unit 120 according to an instruction from the priority determination circuit 140 (step S4).

Specifically, although the priority determination circuit 140 performs priority calculation processing similarly to the processing performed at time T7, since the burst number of the NIT packet is larger than 1, and the value of the burst number counter 142B is 1, which is less than the burst number, the priority determination circuit 140 judges that the transmission period of the NIT packet is period A (step S20: YES), and sets the burst interval "0.1 msec" as the NIT reception interval (step S21).

Also, since the burst number of the data (DMS-CC) stored in the storage unit 122 of the data management unit 121A is "1", the priority determination circuit 140 judges that the transmission period of the DMS-CC packet is not period A (step S23: NO), and sets, as the reception interval of DMS-CC, a time "1.5 msec" obtained by subtracting the value of the timer 125 (1.5 msec) (the elapsed time from time T15) of the data management unit from the cycle "3 msec" (step S25).

Also, since the burst number "2" of the data (EIT) stored in the storage unit 122 of the data management unit 121B is larger than 1, and the value of the burst number counter 142C is "2" which matches the burst number, the priority determination circuit 140 judges that the transmission period of the EIT packet is not period A (step S23: NO), and sets, as the EIT reception interval, a time "99.6 msec" obtained by subtracting the value of the timer 125 "0.4 msec" (the elapsed time from the time T17) from the cycle "100 msec" (step S24).

Since the priority of NIT is not the lowest (step S15: NO), the priority determination circuit 140 instructs the buffer unit 120 to transmit the data (EIT) stored in the storage unit 122 of the data management unit 121B that has the lowest priority and the PID stored in the identifier storage unit 123 of the data management unit 121B (step S17), and instructs transmission of the received packet to the buffer unit 120 (step S18). Note that to perform the instruction, the priority determination circuit 140 transmits the PID of the EIT to the buffer unit 120.

Since a transmission instruction has been received from the priority determination circuit 140 (step S30: YES in FIG. 13), the storage control unit 126 of the buffer unit 120 transmits data (EIT) stored in the storage unit 122 of the data management unit 121B and the PID stored in the identifier storage unit 123 to the multiplex circuit 130 (step S31), and sets the valid flag storage unit 124 of the data management unit 121A to "0".

Also, since a PID that matches the PID of the transmitted packet is not stored (step S32: NO in FIG. 13), the storage control unit 126 selects the unused data management unit 121B (step S34), stores the valid data (NIT divided data) of the transmitted packet, the PID, and "1" in the storage unit 122, the identifier storage unit 123, and the valid flag storage unit 124 of the data management unit 121A, respectively, and after initializing the timer 125 of the data management unit 121B, starts timing (step S36).

Also at this time, since the section length 52 is included in the NIT packet (step S41: YES in FIG. 14), the completion control unit 154 of the analysis unit 150 stores the section length 52 in the section length storage unit 152 of the section length management unit 151B (step S42), and after initializing the value of the section size count unit 153 to "0", counts up the section size count unit 153 by the amount of the data size stored in the storage unit 122 of the data management unit 121B (step S43), and the analysis unit 150 ends the processing (step S44: NO).

Also, since the size of the data stored in the storage unit 122 of the data management unit 121B is less than 256 bytes (step S37: NO in FIG. 13), and a transmission instruction has not been received from the analysis unit 150 (step S39: NO), the storage control unit 126 of the buffer unit 120 ends the processing.

T19

At time T19 (11.6 msec), the switching circuit 110 receives the NIT packet (steps S1, S2: NO in FIG. 10), and thereafter processing is performed similarly to T8, valid data (NIT divided data) is stored in the storage unit 122 of the data management unit 121B, and the storage control unit 126 of the buffer unit 120 transmits data (NIT) stored in the storage unit 122 of the data management unit 121B and the PID stored in the identifier storage unit 123 of the data management unit 121B to the multiplex circuit 130 according to a transmission instruction from the analysis unit 150 (step S40). Note that at this time, the valid flag storage unit 124 of the data management unit 121A is set to "0".

T20

At time T10 (12 msec), the switching circuit 110 receives a DSM-CC packet (steps S1, S2: NO in FIG. 10), and thereafter, although basically similarly to the case of T10, valid data (DSM-CC divided data) is stored in the storage unit 122 of the data management unit 121A, the 256 bytes of data from the start of the data stored in the storage unit 122 and the PID stored in the identifier storage unit 123 of the data management unit 121A are transmitted to the multiplex circuit 130.

The operation of the buffer management apparatus 100 has been described above with reference to two specific examples. In both cases, judging whether to store data in either one of the storage units 122 is controlled appropriately according to the usage conditions of the storage units 122 at the time of receiving the packet. In particular, if data of different types from the received packet are stored in both of the storage units 122, at the time of reception, this structure transmits, to an external device, data that has a latest time until receiving a next piece of data of the same type. Therefore, this structure enables storing data of types that are comparatively frequently received, and performing buffering efficiently.

Variations

In the embodiments, the burst number 62, the burst interval 63, and the cycle 64 shown in FIG. 9 are described as being set in advance for each type of section data in the transmission interval storage units (141A to 141D) of the priority determination circuit 140, for example, by an administrator, etc. of the buffer management apparatus 100, but alternatively, the apparatus may obtain and set the data.

The following describes a buffer management apparatus 200 pertaining to a variation, focusing on the differences from the buffer management apparatus 100 pertaining to the embodiment.

Figure 17:
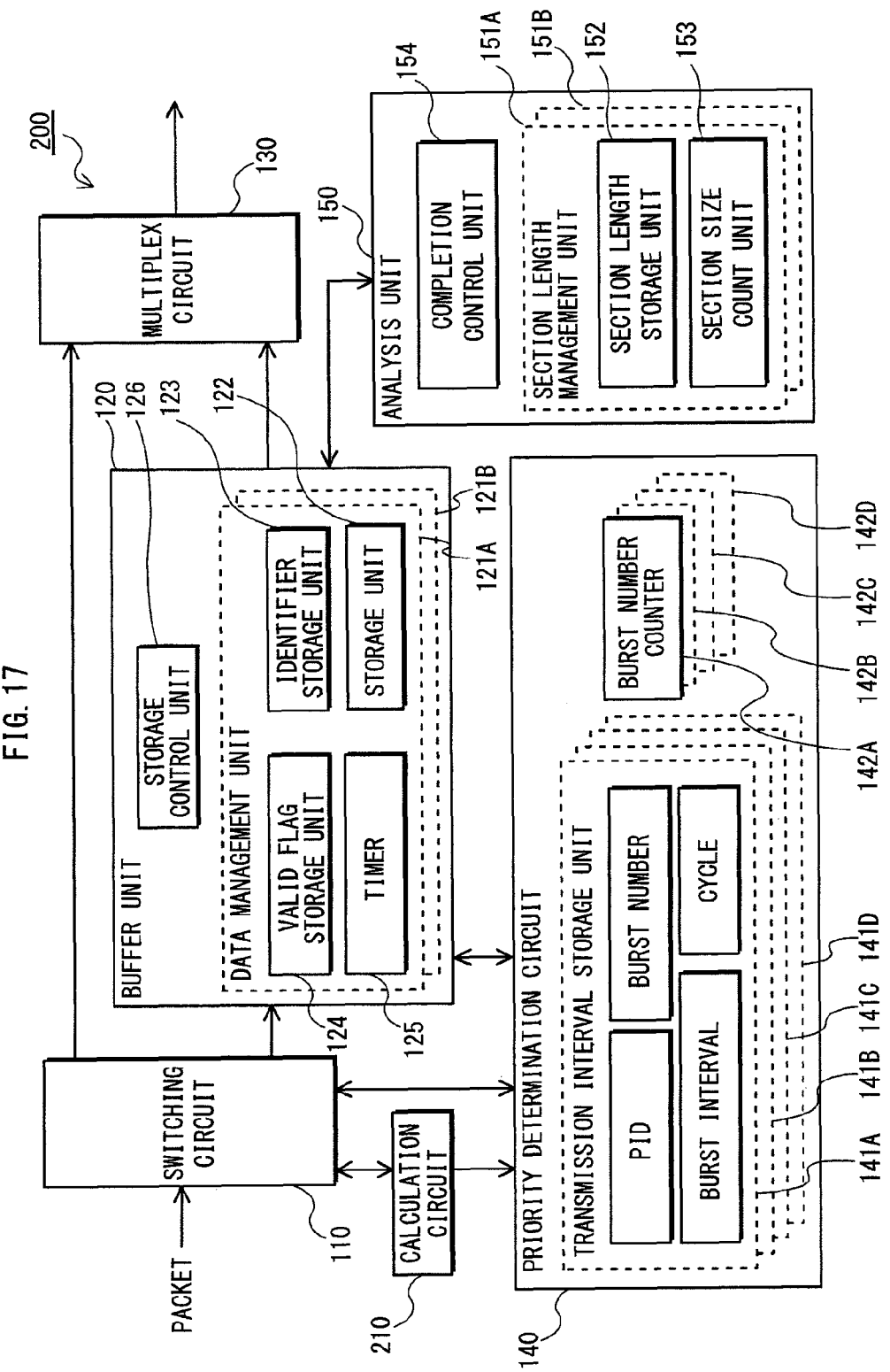
FIG. 17 is a functional block diagram of a buffer management apparatus 200 pertaining to a variation.

FIG. 17 is a functional block diagram of the buffer management apparatus 200.

The buffer management apparatus 200 includes a calculation circuit 210 in addition to the structure of the buffer management apparatus 100.

Here, the calculation circuit 210, for each type of section data, calculates a burst number, a burst interval, and a cycle, and stores the calculated burst number, burst interval and cycle in the transmission interval storage units 141A to 141D.

More specifically, the calculation circuit 210 includes the same number of timers as the number of types of packet, and at a fixed amount of time from when the switching circuit 110 starts receiving packets, for each type of received packet (each PID), measures a reception interval for receiving a consecutive packet of the same type, and for each type of packet, generates a histogram for the measured reception interval.

The calculation circuit 210 detects, for each histogram of the measured reception intervals, a peak portion (the apex portion of the histogram). Reception intervals corresponding to the peak portions are correlated to the burst interval and the cycle. If there is one peak portion, the reception interval corresponding to the peak is set as the cycle, and if there are two peak portions, the reception interval corresponding to the smaller peak is set as the burst interval, and the reception interval corresponding to the larger peak is set as the cycle. Also, a frequency corresponding to the reception interval that is the burst interval is set as the burst number.

Note that as a method of detecting the peak portion, for example, a method may be used of detecting the peak from a general histogram, for example, by obtaining a difference in frequency for neighboring reception intervals, extracting a point at which the difference changes from positive to negative, etc. Also, for example, if there are three peak portions, since a margin of error is thought to be included, a difference is calculated between reception intervals corresponding to peaks that are neighboring when arranged in ascending order of the corresponding reception intervals thereof, and if the difference is within a predetermined range, as the margin of error, average values of the reception intervals corresponding to each set of two peaks are set as the burst interval and the cycle, respectively.

Note that, upon storing the calculated burst number, burst interval, and cycle in the transmission interval storage units 141A to 141D, the calculation circuit 210 notifies the switching circuit 110 to that effect. Until receiving the notification, the switching circuit 110 transmits all received packets to the multiplex circuit 130.

Additional Remarks

Although the buffer management apparatus pertaining to the present invention is described based on the above embodiment and variation, modifications such as the following are also included in the present invention, and the present invention is of course not limited to the buffer management apparatus described in the above embodiment and variation.

(1) The calculation circuit 210 of the buffer management apparatus 200 pertaining to the variation may be caused not to immediately store the burst number, burst interval, and cycle calculated for each data type in the transmission interval storage units 141A to 141D. That is to say, when the calculation has finished, the calculation circuit pertaining to this modification (hereinafter referred to as the "modification calculation circuit") transmits a notification to that effect to the switching circuit 110, and thereafter, the switching circuit 110 operates as described in the embodiment.

Also, in the modification, for the priority determination circuit 140 also, if data necessary for calculating the priority is not stored in any of the transmission interval storage units (141A to 141D), a notification to that effect (including information indicating the type of necessary data, for example the PID) is transmitted to the variation calculation circuit, and the variation calculation circuit that received the notification may store data necessary for calculating the priority (burst number, burst interval, cycle) to the transmission interval storage unit of the priority determination circuit pertaining to the modification.

At this time, in particular if the number of transmission interval storage units (the number of data management units+1 or more) is less than the types of receivable packets, it is necessary to store, in the transmission interval storage unit, the data necessary for calculating the priority, in place of data that is unnecessary for calculating the priority that is already stored in the transmission interval storage unit, according to the availability of a transmission interval storage unit in which a burst number, etc. is not stored (an unused transmission interval storage unit). In other words, if there is an unused transmission interval storage unit, the data necessary for calculating the priority is stored in the transmission interval storage unit, and if there is not an unused transmission interval storage unit, the data necessary for calculating the priority is stored (overwritten) in the transmission interval storage unit in which data unnecessary for calculating the priority is already stored.

(2) Although an example of receiving one type of transport stream is described in the embodiments and variation, a plurality of transport streams may be received. In this case, among the structures of the embodiments and variation, it is necessary to include a number of pairs of the transmission interval storage units 141A to 141D and the burst number counters 142A to 142D of the priority determination circuit 140 equal to the number of types of receivable transport streams. Also, it is necessary to include a transport stream storage unit that stores transport stream IDs corresponding to each pair. Also, since the transport stream IDs are transmitted by PAT (see FIG. 4), in the present modification, when the switching circuit 110 has received a PAT, a transport stream ID is detected, the detected information is transmitted to the priority determination circuit 140, and it is necessary to add a selection circuit that switches to using a corresponding pair among the plurality of pairs to the structure described in the embodiment and variation. Note that the function of the selection circuit may be fulfilled by the priority determination circuit 140.

(3) In the modification (2) above, if a plurality of transport streams are received, the number of pairs of transmission interval storage units 141A to 141D and burst number counters 142A to 142D provided in the priority determination circuit 140 is the same as the number of types of receivable transport stream. However, the number may also be less than the number of receivable transport streams.

In this modification, it is necessary to detect the transport stream ID transmitted by the PAT, and to add, to the structure described in the variation, a selection circuit that transmits the detected information to the priority determination circuit 140. Also, the priority determination circuit 140 may also be modified so that, if data corresponding to the transmitted transport stream ID (the burst number, burst interval, and cycle for each type of packet) is not stored in any of the groups of transmission interval storage units, a notification to that effect (including the transport stream ID), is transmitted to the calculation circuit, and the calculation circuit that has received the notification stores the data of corresponding transport streams (the burst number, burst interval, and cycle) in one of the group of transfer interval storage units of the priority determination circuit pertaining to this modification.

At this time, the calculation circuit pertaining to this modification is required to store data (the burst number, burst interval, and cycle for each type of packet) corresponding to the transport stream pertaining to the notification, in place of the data corresponding to the other transport streams already stored in the group of transmission interval storage units (the burst number, burst interval, and cycle for each type of packet), according to the availability of a group of transmission interval storage units (an unused group of transmission interval storage units) in which data (the burst number, burst interval, and cycle for each type of packet) is not stored.

In other words, in a case that there is an unused group of transmission interval storage units, the data is stored in the unused group of transmission storage units, and if there is not an unused group of transmission interval storage units, the data is stored (overwritten) in the group of transport interval storage units in which the data for other transport streams is stored.

Note that the function of the selection circuit described above may be fulfilled by the priority determination circuit 140.

(4) In the embodiment and variation, an example is described of the number of data management units being 2. However, the number of data management units provided may be caused to depend on the allowable circuitry scale in the buffer management apparatus.

(5) In the embodiment and variation, the buffer unit 120 is described as including the storage control unit 126, and one storage control unit 126 is described as controlling the data management units. However, separate control units may be provided for each of the data management units.

(6) In the embodiment and variation, an example is described in which the buffer management apparatus pertaining to the present invention is used in the data transfer apparatus 1000. However, the buffer management apparatus pertaining to the present invention may be used for receiving a plurality of types of data not limited to section data, and transmitting data of each type collectively (as a group).

(7) In the embodiment and variation, a premise of the description is that there is a transmission interval storage unit in which a PID is stored that matches the PID of the received packet. However, if the number of transmission interval storage units is less than the number of types of receivable packets (types of section data), cases arise in which there is not a transmission interval storage unit that stores an identical PID to the PID of the received packet.

In view of this, if there is not a transmission interval storage unit that stores an identical PID to the PID of the received packet, the priority determination circuit 140 may instruct the switching circuit 110 to transmit the received packet to the buffer unit 120. That is to say, a step may be added, between step S13 and step S14 in FIG. 11, of judging whether there is a transmission interval storage unit that stores a PID that is identical to the PID of the received packet, and if there is a PID that is identical to the PID of the received packet, the processing from step S14 onward is performed, and if there is not a transmission interval storage unit that stores a PID that is identical to the PID of the received packet, the processing from step S16 onward may be performed.

(8) The constituent elements described in the embodiment and variation may be realized either entirely or in part by a computer program, or may be realized by an integrated circuit constituted from one chip or a plurality of chips.

Figure 18:
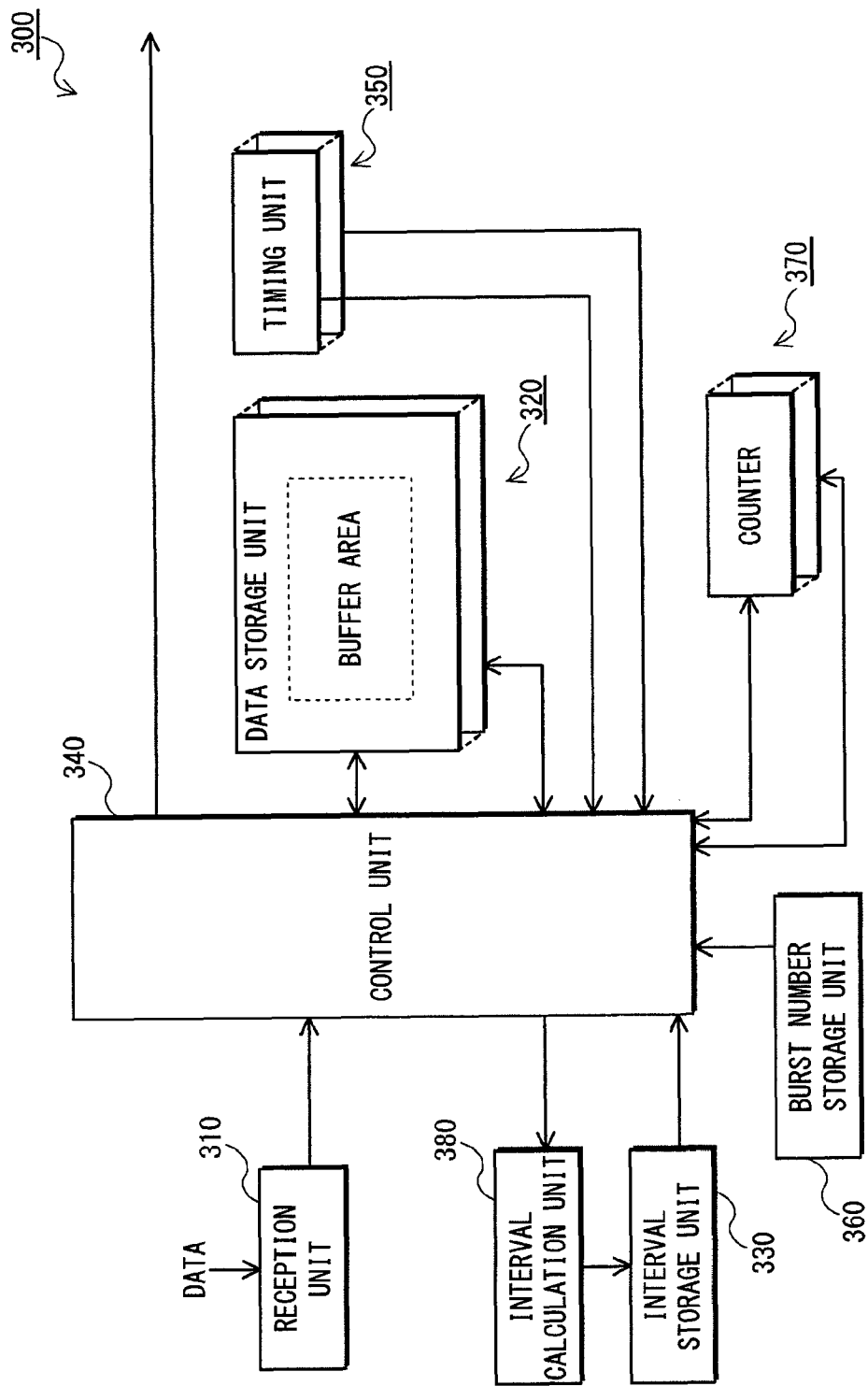
FIG. 18 illustrates a buffer management apparatus pertaining to the present invention.

(9) In the embodiment and variation, exemplary structures of the buffer management apparatus are described as shown in FIGS. 2 and 17. However, the structure shown in FIG. 18 may also be used. That is to say, a buffer management apparatus 300 that sequentially receives L (L>1) types of data and transmits the L types of data to an external device, including: a reception unit 310 operable to receive data; M (M<L) data storage units 320, each including a buffer area, and each to be allocated respectively to data of a same type as data stored in the buffer area thereof; an interval storage unit 330 operable to, for each type of data, store information pertaining to a reception interval thereof, the reception interval being a length of time between receiving two pieces of a same type of data; M timing units 350 in one-to-one correspondence with the data storage units, each operable to time an elapsed time from a last storing of data in a corresponding data storage unit, and a control unit 340, wherein if a data storage unit has been allocated to data of a same type as the data received by the reception unit, the control unit 340 stores the received data in the data storage unit, and, according to a predetermined condition, transmits data stored in the data storage unit to the external device, if a data storage unit has not been allocated to data of the same type as the data received by the reception unit 310, and there is one or more data storage units that have not been allocated to any type of data, the control unit stores the received data in one of the one or more data storage units that have not been allocated to any type of data, and allocates the data storage unit to data of the same type as the stored received data, if all of the data storage units have been allocated to different types of data from the data received by the reception unit 310, the control unit judges, according to the elapsed times timed by the timing units in correspondence with the data storage units and information stored in the interval storage unit 330, whether to cause the received data to be stored in any of the data storage units, if the judgment is affirmative, the control unit transmits all of the data stored in at least one of the data storage units to the external device, stores the received data in the at least one of the data storage units, and allocates the at least one of the data storage units to data of the same type as the stored data, and if the judgment is negative, the control unit transmits the received data to the external device, may be used.

Also, the control unit 340 may calculate, for each data storage unit, a first time that is a time period until receiving a next piece of data of a same type as data allocated to the data storage unit, according to an elapsed time timed by a timing unit corresponding to the data storage unit and information pertaining to the reception interval for data of the type allocated to the data storage unit, calculate, for the type of data received by the reception unit 310, a second time that is a time period from receiving the received data until receiving a next piece of data of the same type as the received data, according to information pertaining to the reception interval stored in the interval storage unit 330, judge negatively if the second time is longer than each of the first times, and judge affirmatively if the second time is shorter than one of the first times, and the data storage unit in which the received data is stored if the judgment is affirmative is a data storage unit storing data of a type for which the first time is shorter than the second time.

Also, the L types of data may include a plurality of types of intermittently received data having two types of reception interval, a first interval, and a second interval that is longer than the first interval, and the information stored in the interval storage unit 330 pertaining to the reception intervals for the intermittently received data may include information indicating a first interval and information indicating a second interval, and the buffer management apparatus 300 may further include: a burst number storage unit 360 operable to store, for each type of intermittently received data, a burst number that is a number of pieces of the type of intermittently received data consecutively received at every occurrence of the first interval, and a plurality of counters 370 operable to count, for each type of the intermittently received data, a reception number indicating a number of times of receiving pieces of the type of intermittently received data, wherein the information used by the control unit 340 for calculating the first time and the second time of the intermittently received data may be information indicating the first interval when a counter value corresponding to the intermittently received data is less than a value stored in the burst number storage unit 360 for the intermittently stored data, and may be information indicating the second interval when the counter value corresponding to the intermittently received data is identical to the value stored in the burst storage unit 360 pertaining to the intermittently received data, and the control unit 340, when the counter value corresponding to the intermittently received data exceeds the value stored in the burst number storage unit 360 for the type of intermittently received data, may set the counter value to 1, and perform the calculation.

Also, the buffer management apparatus 300 may further include an interval calculation unit operable to, for each type of data, measure a reception interval of receiving the type of data, and store a value according to the measurement in the interval storage unit 330 as information pertaining to the reception interval for the type of data.

Also, the interval storage unit 330 may be operable to store information pertaining to reception intervals of N (N<L) types of data, the control unit 340, if the information pertaining to the reception interval for the type of data received by the reception unit 310 is not stored in the interval storage unit 330, may notify information indicating the type of data to the interval calculation unit 380, and the interval calculation unit 380, when the notified information has been received from the control unit 340, may (i) if information pertaining to the reception intervals of the N types of data is not stored in the interval storage unit 330, store a value according to the measurement of the type of data indicated by the notified information in the interval storage unit 330 as the information pertaining to the reception interval for the type of data, and (ii) if information pertaining to the reception intervals of the N types of data is stored in the interval storage unit 330, store, in place of the information pertaining to the reception interval of any one type of data, the value according to the measurement of the type of data indicated by the notified information in the interval storage unit 330 as the information pertaining to the reception interval for the type of data.

Also, the buffer management apparatus 300 may sequentially receive the L types of data, and perform processing for transmitting the L types of data to the external device separately for each of a plurality of data sets, wherein one type of data from among the L types of data may include identification information of a data set in which the data is included, the interval calculation unit 380, for each type of the data, may measure a reception interval for the type of data, and perform processing for storing the value according to the measurement in the interval storage unit 330, as the information pertaining to the reception interval for the type of data, for each of the plurality of data sets respectively; the interval storage unit may be operable to store, for each of P data sets when P is a number that is less than a number of receivable data sets, information pertaining to reception intervals of L types of data, the control unit 340, when identification information of the data set is included in the received data, if the information pertaining to the reception interval for the data set identified by the identification information is not stored in the interval storage unit 330, may notify the identification information to the interval calculation unit 380, and the interval calculation unit 380, when a notification has been received from the control unit 340, (i) if information pertaining to the reception intervals of the P data sets is not stored in the interval storage unit 330, may store a value according to the measurements of the types of data for the data sets indicated by the notified identification information, in the interval storage unit 330 as the information pertaining to the reception interval, and (ii) if information pertaining to the reception intervals of the P data sets is stored in the interval storage unit 330, store, in place of the information pertaining to the reception interval of any one data set, the value according to the measurements of the types of data for the data set indicated by the notified identification information, in the interval storage unit 330 as the information pertaining to the reception interval.

INDUSTRIAL APPLICABILITY

The buffer management apparatus pertaining to the present invention can be used to improve the use efficiency of a buffer.

The invention claimed is:
1. A buffer management apparatus that sequentially receives L (L>1) types of data and transmits the L types of data to an external device, comprising:
 a reception unit operable to receive data;
 M (M<L) data storage units, each including a buffer area, and each to be allocated respectively to data of a same type as data stored in the buffer area thereof;

an interval storage unit operable to, for each type of data, store information pertaining to a reception interval thereof, the reception interval being a length of time between receiving two pieces of a same type of data;

M timing units in one-to-one correspondence with the data storage units, each operable to time an elapsed time from a last storing of data in a corresponding data storage unit, and a control unit, wherein if a data storage unit has been allocated to data of a same type as the data received by the reception unit, the control unit stores the received data in the data storage unit, and, according to a predetermined condition, transmits data stored in the data storage unit to the external device, if none of the M data storage units has been allocated to data of the same type as the data received by the reception unit, and there is one or more data storage units that have not been allocated to any type of data, the control unit stores the received data in one of the one or more data storage units that have not been allocated to any type of data, and allocates the data storage unit to data of the same type as the stored received data, if all of the data storage units have been allocated to different types of data from the data received by the reception unit, the control unit judges, according to the elapsed times timed by the timing units in correspondence with the data storage units and information stored in the interval storage unit, whether to cause the received data to be stored in any of the data storage units, if the judgment is affirmative, the control unit transmits all of the data stored in at least one of the data storage units to the external device, stores the received data in the at least one of the data storage units, and allocates the at least one of the data storage units to data of the same type as the stored data, and if the judgment is negative, the control unit transmits the received data to the external device.

2. The buffer management apparatus of claim 1, wherein the control unit calculates, for each data storage unit, a first time that is a time period until receiving a next piece of data of a same type as data allocated to the data storage unit, according to an elapsed time timed by a timing unit corresponding to the data storage unit and information pertaining to the reception interval for data of the type allocated to the data storage unit, calculates, for the type of data received by the reception unit, a second time that is a time period from receiving the received data until receiving a next piece of data of the same type as the received data, according to information pertaining to the reception interval stored in the interval storage unit, judges negatively if the second time is longer than each of the first times, and judges affirmatively if the second time is shorter than one of the first times, and the data storage unit in which the received data is stored if the judgment is affirmative is a data storage unit storing data of a type for which the first time is shorter than the second time.

3. The buffer management apparatus of claim 2, wherein the L types of data include a plurality of types of intermittently received data having two types of reception interval, a first interval, and a second interval that is longer than the first interval, and the information stored in the interval storage unit pertaining to the reception intervals for the intermittently received data includes information indicating a first interval and information indicating a second interval, and further comprising:

a burst number storage unit operable to store, for each type of intermittently received data, a burst number that is a number of pieces of the type of intermittently received data consecutively received at every occurrence of the first interval, and a plurality of counters operable to count, for each type of the intermittently received data, a reception number indicating a number of times of receiving pieces of the type of intermittently received data, wherein the information used by the control unit for calculating the first time and the second time of the intermittently received data is information indicating the first interval when a counter value corresponding to the intermittently received data is less than a value which is calculated by a value stored in the burst number storage unit for the intermittently stored data, and is information indicating the second interval when the counter value corresponding to the intermittently received data is identical to the value which is calculated by the value stored in the burst storage unit pertaining to the intermittently received data, and the control unit, when the counter value corresponding to the intermittently received data exceeds the value stored in the burst number storage unit for the type of intermittently received data, sets the counter value to an initial value, and performs the calculation.

4. The buffer management apparatus of claim 2, further comprising:

an interval calculation unit operable to, for each type of data, measure a reception interval of receiving the type of data, and store a value according to the measurement in the interval storage unit as information pertaining to the reception interval for the type of data.

5. The buffer management apparatus of claim 4, wherein the interval storage unit is operable to store information pertaining to reception intervals of N (N<L) types of data, the control unit, if the information pertaining to the reception interval for the type of data received by the reception unit is not stored in the interval storage unit, notifies information indicating the type of data to the interval calculation unit, and the interval calculation unit, when the notified information has been received from the control unit, (i) if information pertaining to the reception intervals of the N types of data is not stored in the interval storage unit, stores a value according to the measurement of the type of data indicated by the notified information in the interval storage unit as the information pertaining to the reception interval for the type of data, and (ii) if information pertaining to the reception intervals of the N types of data is stored in the interval storage unit, stores, in place of the information pertaining to the reception interval of any one type of data, the value according to the measurement of the type of data indicated by the notified information in the interval storage unit as the information pertaining to the reception interval for the type of data.

6. The buffer management apparatus of claim 4 that sequentially receives the L types of data, and performs processing for transmitting the L types of data to the external device separately for each of a plurality of data sets, wherein one type of data from among the L types of data includes identification information of a data set in which the data is included, the interval calculation unit, for each type of the data, measures a reception interval for the type of data, and performs processing for storing the value according to the measurement in the interval storage unit, as the information pertaining to the reception interval for the type of data, for each of the plurality of data sets respectively;

the interval storage unit is operable to store, for each of P data sets when P is a number that is less than a number of receivable data sets, information pertaining to reception intervals of L types of data, the control unit, when identification information of the data set is included in the received data, if the information pertaining to the reception interval for the data set identified by the identification information is not stored in the interval storage unit, notifies the identification information to the interval calculation unit, and the interval calculation unit, when a notification has been received from the control unit, (i) if information pertaining to the reception intervals of the P data sets is not stored in the interval storage unit, stores a value according to the measurement of the type of data for the data sets indicated by the notified identification information, in the interval storage unit as the information pertaining to the reception interval, and (ii) if information pertaining to the reception intervals of the P data sets is stored in the interval storage unit, stores, in place of the information pertaining to the reception interval of any one data set, the value according to the measurement of the type of data for the data set indicated by the notified identification information, in the interval storage unit as the information pertaining to the reception interval.

7. A buffer management method used in a buffer management apparatus that sequentially receives L (L>1) types of data and transmits the L types of data to an external device, the buffer management apparatus including:

M (M<L) data storage units, each including a buffer area, and each to be allocated respectively to data of a same type as data stored in the buffer area thereof;

an interval storage unit operable to, for each type of data, store information pertaining to a reception interval thereof, the reception interval being a length of time between receiving two pieces of a same type of data, and M timing units in one-to-one correspondence with the data storage units, each operable to time an elapsed time from a last storing of data in a corresponding data storage unit, the buffer management method including:

a reception step of a reception unit receiving data, and a transmission step in which a control unit, if a data storage unit has been allocated to data of a same type as the data received by the reception unit, stores the received data in the data storage unit, and, according to a predetermined condition, transmits data stored in the data storage unit to the external device, if none of the M data storage units has been allocated to data of the same type as the data received by the reception unit, and there is one or more data storage units that have not been allocated to any type of data, the control unit stores the received data in one of the one or more data storage units that have not been allocated to any type of data, and allocates the data storage unit to data of the same type as the stored received data, if all of the data storage units have been allocated to different types of data from the data received by the reception unit, the control unit judges, according to the elapsed times timed by the timing units in correspondence with the data storage units and information stored in the interval storage unit, whether to cause the received data to be stored in any of the data storage units, if the judgment is affirmative, the control unit transmits all of the data stored in at least one of the data storage units to the external device, stores the received data in the at least one of the data storage units, and allocates the at least one of the data storage units to data of the same type as the stored data, and if the judgment is negative, the control unit transmits the received data to the external device.

8. An integrated circuit for buffer management used in a buffer management apparatus that sequentially receives L (L>1) types of data and transmits the L types of data to an external device, comprising:

a reception unit operable to receive data;

M (M<L) data storage units, each including a buffer area, and each to be allocated respectively to data of a same type as data stored in the buffer area thereof;

an interval storage unit operable to, for each type of data, store information pertaining to a reception interval thereof, the reception interval being a length of time between receiving two pieces of a same type of data;

M timing units in one-to-one correspondence with the data storage units, each operable to time an elapsed time from a last storing of data in a corresponding data storage unit, and a control unit, wherein if a data storage unit has been allocated to data of a same type as the data received by the reception unit, the control unit stores the received data in the data storage unit, and, according to a predetermined condition, transmits data stored in the data storage unit to the external device, if none of the M data storage units has been allocated to data of the same type as the data received by the reception unit, and there is one or more data storage units that have not been allocated to any type of data, the control unit stores the received data in one of the one or more data storage units that have not been allocated to any type of data, and allocates the data storage unit to data of the same type as the stored received data, if all of the data storage units have been allocated to different types of data from the data received by the reception unit, the control unit judges, according to the elapsed times timed by the timing units in correspondence with the data storage units and information stored in the interval storage unit, whether to cause the received data to be stored in any of the data storage units, if the judgment is affirmative, the control unit transmits all of the data stored in at least one of the data storage units to the external device, stores the received data in the at least one of the data storage units, and allocates the at least one of the data storage units to data of the same type as the stored data, and if the judgment is negative, the control unit transmits the received data to the external device.

* * * * *